United States Patent
Nair

(10) Patent No.: US 11,611,544 B2
(45) Date of Patent: Mar. 21, 2023

(54) DELAYED USER AUTHENTICATION

(71) Applicant: PayPal, Inc., San Jose, CA (US)

(72) Inventor: Rahul Nair, Leander, TX (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 17/066,164

(22) Filed: Oct. 8, 2020

(65) Prior Publication Data

US 2022/0116374 A1 Apr. 14, 2022

(51) Int. Cl.
*H04L 9/40* (2022.01)
*H04L 51/046* (2022.01)
*H04W 4/14* (2009.01)

(52) U.S. Cl.
CPC .......... *H04L 63/08* (2013.01); *H04L 51/046* (2013.01); *H04W 4/14* (2013.01)

(58) Field of Classification Search
CPC ....... H04L 63/08; H04L 51/046; H04L 51/04; H04L 51/043; H04W 4/14
USPC ............. 726/7; 709/203, 206, 217, 226, 229
See application file for complete search history.

(56) References Cited

U.S. PATENT DOCUMENTS

| | | | |
|---|---|---|---|
| 8,326,759 B2 | 12/2012 | Hammad | |
| 8,973,109 B2 | 3/2015 | Jillings | |
| 9,392,456 B2 | 7/2016 | Disraeli et al. | |
| 11,063,943 B2* | 7/2021 | Stoops | H04L 51/046 |
| 2007/0136303 A1* | 6/2007 | Singhai | G06Q 10/10 |
| 2016/0050203 A1 | 2/2016 | Hefetz | |
| 2016/0050393 A1* | 2/2016 | Mande | H04N 7/15 |
| | | | 348/14.12 |
| 2016/0099892 A1* | 4/2016 | Palakovich | H04L 51/04 |
| | | | 709/206 |
| 2018/0302861 A1* | 10/2018 | Zhao | H04L 67/14 |
| 2020/0053096 A1* | 2/2020 | Bendersky | G06F 21/44 |
| 2020/0169629 A1 | 5/2020 | Zhao et al. | |
| 2020/0220864 A1* | 7/2020 | Goodsitt | H04L 63/0846 |
| 2020/0288315 A1 | 9/2020 | Hanley et al. | |
| 2020/0304542 A1* | 9/2020 | Ilincic | H04M 3/5175 |

OTHER PUBLICATIONS

International Search Report and Written Opinion in PCT Appl. No. PCT/US2021/053547 dated Jan. 11, 2022, 16 pages.

* cited by examiner

*Primary Examiner* — Kaylee J Huang
(74) *Attorney, Agent, or Firm* — Kowert, Hood, Munyon, Rankin & Goetzel, P.C.; Catherine L. Gerhardt; Dean M. Munyon

(57) ABSTRACT

Techniques are disclosed relating to a delayed presentation of authentication challenge for users, such as in the context of a chat session. In various embodiments, a server system receives an indication of a request for service initiated by a user in a chat session within an application executed by a client device. The request for service involves an authentication of the user that is dependent on the authentication being successfully completed within a particular time period after the authentication is initiated. The server system delays the initiation of authentication for the request for service until a readiness condition is satisfied. The readiness condition includes the server system being available to process the request for service, as well as subsequently detecting engagement with the user relating to the request for service. In response to the readiness condition being satisfied, the server system initiates the authentication of the user.

20 Claims, 18 Drawing Sheets

DELAYED USER AUTHENTICATION

BACKGROUND

Technical Field

This disclosure relates generally to computer transactions, and, more specifically, to authentication of a user, such as during a chat session.

Description of the Related Art

Various types of computer interactions involve user authentication or taking some type of action with respect to the user. For example, when a user of a client device makes a request for a particular service from a server system through a chat session, the server system may contact a chat representative to authorize the request before providing the service. Prior to commencement of the chat or during the chat, there may need to be an authentication of the user. In some cases, a successful authentication is a prerequisite for the server system to provide the requested service to the user.

DETAILED DESCRIPTION

Figure 1:
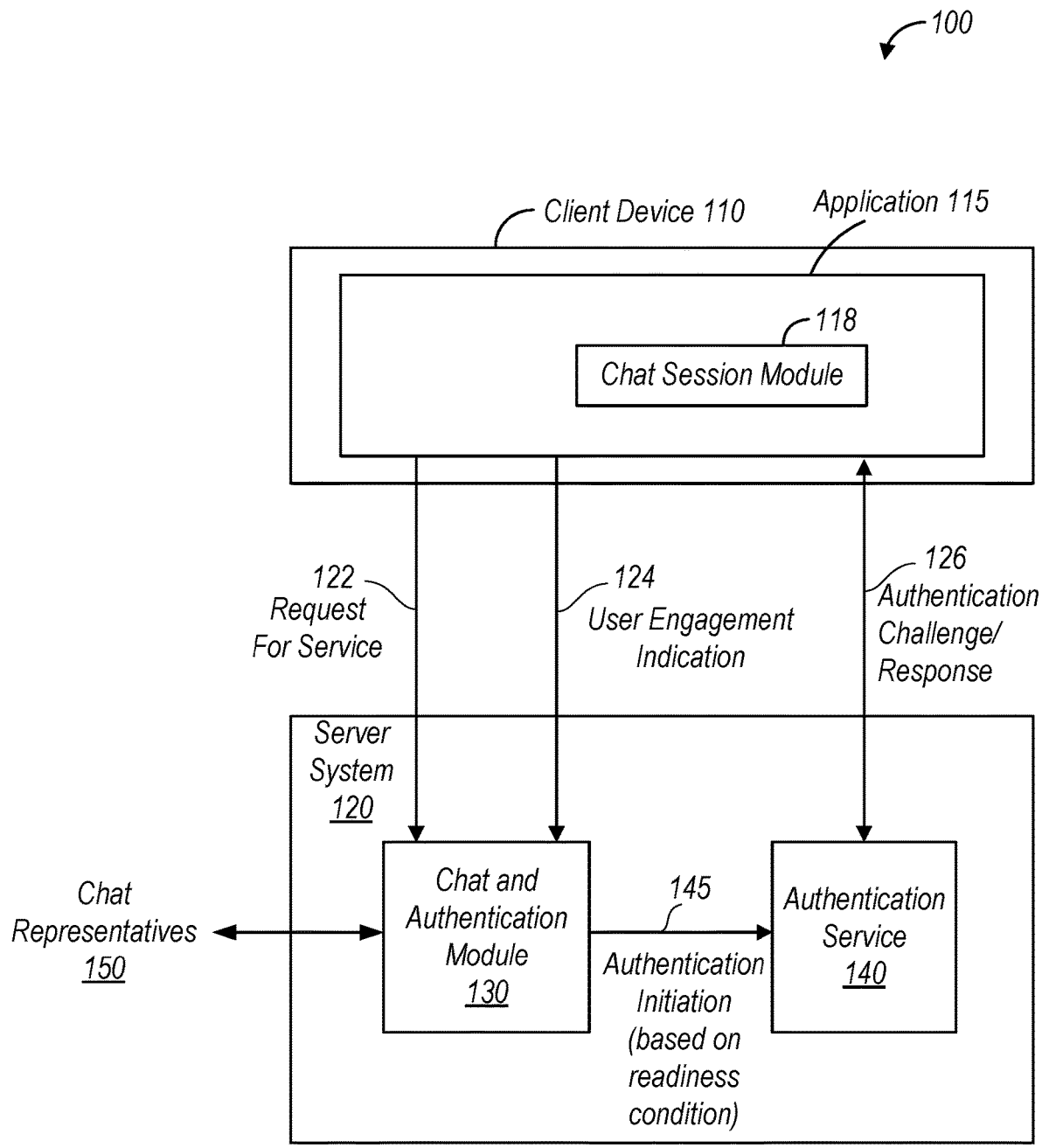
FIG. 1 is a block diagram of one embodiment of a system for implementing delayed authentication in response to a request for service received by a server system from a client device as part of a chat session.

A user of a client device may use the device to request a particular service from a server system in a client-server architecture. Many server systems present the user with an option to use an asynchronous chat session with a chat representative in order to perform the requested service. An "asynchronous" chat session involves interaction between the user and a chat representative (acting on behalf of an entity associated with the server system) that is similar to an interaction through email; that is, the asynchronous chat service proceeds in spurts, as opposed to a synchronous continuous conversation. The asynchronous chat session provides an advantage for the operator of the server system of lowering operational costs by requiring a lesser number of chat representatives than might be needed if all chat service were synchronous. As used herein, the term "user" refers to a human actor using the client device (for example, a human using an application on the client device) to communicate with the server system. At any given time, the server system may be processing requests for chat sessions from multiple users. Since the number of chat representatives available to handle user requests is limited, a particular user's request may be placed in a processing queue while waiting for one of the multiple chat representatives to become available.

Access to the chat session itself, or some action taken in the context of the chat session, may involve authentication of the user. It is common for the success of certain types of authentication to be dependent on the authentication being successfully completed within a particular time period after the authentication is initiated. An example is an authentication performed using a Short Message Service (SMS) One-Time Passcode (OTP) challenge, for which the user has to provide a response within a timeout period (typically a few minutes). In some implementations, once a chat representative becomes available to handle the user's request for service, the server system may initiate authentication of the user.

But as noted, there can be an appreciable delay in the time that a chat representative is available relative to the user's request for service. Due to this potentially long delay for a chat representative to be available, the user may "disengage" from the chat session (e.g., by putting down his or her mobile device that is being used for the chat session). As a result of this disengagement, the user may not respond to an authentication challenge before the authentication challenge times out. This paradigm may lead to a high rate of failure during authentication attempts of various users of asynchronous chat sessions by the server system.

The present disclosure recognizes that, with the increased adoption of asynchronous chat sessions across more and more server systems, there is a need to resolve the high rate of failures of authentication attempts for asynchronous chat sessions by delaying user authentication until a readiness condition is satisfied. In one embodiment, this readiness condition includes a chat representative becoming available to handle a particular user's request for service, as well as detection of "user engagement" relating to the request for service or chat session. This detection of user engagement may take several forms, including response to a push notification about the chat session, detection of a heartbeat signal from the application, etc. By delaying initiation of an authentication challenge until it is more likely that both a chat representative and the user are ready, this increases the chance that the authentication challenge will not timeout.

Turning now to FIG. 1, a block diagram of a system 100 for implementing a delayed authentication of a user of an asynchronous chat session is shown. In the illustrated embodiment, system 100 includes a client device 110, a server system 120, an authentication service 140, and a chat representative 150. In some embodiments, system 100 may be implemented differently than illustrated. For example, authentication service 140 may be separate from the server system 120, and the authentication service may be reachable by either or both of client device 110 and server system 120 through a wide-area network, more (or less) components may be included, etc.

Server system 120, in some embodiments, is a computing system that implements a platform allowing users to develop, run, and manage applications. As an example, server system 120 may be a cloud computing system that provides services to users of transactional applications. In some embodiments, server system 120 may be a multi-tenant system that provides various functionality to a plurality of users/tenants hosted by the multi-tenant system. Accordingly, server system 120 may process requests from various users (e.g., providers and tenants of server system 120) as well as provide code, web pages, and other data to users to facilitate management of user's accounts and data. As depicted, server system 120 may interact with one or more client devices 110.

Server system 120 includes a chat and authentication module 130 that is configured to facilitate the various tasks performed by server system 120 in handling a request for service 122 received from the user of client device 110 and implementing delayed authentication. Chat and authentication module 130 provides an interface to client device 110 through which the request for service 122 is received. Chat and authentication module 130 may also implement a processing queue to store requests for service 122 from multiple users while waiting for one of multiple chat representatives 150 to become available. Chat and authentication module 130 further provides an interface to determine chat representative availability and assign requests for service to particular chat representatives. Still further, authentication module 130 is used to determine whether a user is engaged with the chat session upon a chat representative becoming available. In some embodiments, chat and authentication module 130 sends a notification to the user of client device 110 to determine user engagement, while in other embodiments, a heartbeat signal may signal user engagement. In various embodiments, chat and authentication module 130 uses the availability of a chat representative 150 and a user engagement indication 124 to determine that a readiness condition has been satisfied. This readiness condition may serve as the trigger to send an authentication initiation 145 to authentication service 140. In some embodiments, authentication initiation 145 may include an authentication type for the authentication challenge to be generated by authentication service 140. In other embodiments, authentication service 140 may make this determination or have the authentication challenge type set by another software module such as a risk engine (not shown). Authentication service 140 then commences an authentication challenge and response 126 sequence for the user of client device 110 to complete the authentication of the user.

As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as "operable" to perform operations refers to a software module, a hardware module, or some combination thereof. Further, for any discussion herein that refers to a module that is "executable" to perform certain operations, it is to be understood that those operations may be implemented, in other embodiments, by a hardware module "configured" to perform the operations, and vice versa.

Client device 110, in various embodiments, is a computing device that allows a user of the client device 110 to access, store, and manipulate data that may be obtained from server system 120. Client device 110 may request transactions with server system 120 through a request sent to server system 120. Accordingly, client device 110 may include supporting software that allows operations (e.g., accessing, storing, displaying, etc.) on data generated or received by client device 110. Additionally, client device 110 may support a user interface to facilitate interactions between a user of client device 110 and a server system 120. Examples of a client device 110 include, but are not limited to, consumer devices such as a smartphone, a personal computer system, a desktop computer, laptop or notebook computer, mainframe computer system, tablet computer, handheld computer, workstation, network computer, a music player, or personal data assistant (PDA). Client device 110 may also include persistent storage, or may interface with a storage device or system (e.g., database or a cloud storage system) to facilitate persistent storage.

Client device 110 includes an application 115 executing on client device 110 during a chat session. Application 115 is a module that implements necessary logic to facilitate a chat session between the user of client device 110 and server system 120. In various embodiments, application 115 handles the interfacing of client device 110 with server system 120 during the chat session. Application 115 includes a chat session module 118 that provides a user interface to the user of client device 110 to enable the user to start or stop a chat session with server system 120, and to manage the operations of the chat session with server system 120.

In some embodiments, chat session module 118 provides a user engagement indication 124 to server system 120. In some cases, user engagement indication 124 may be sent when application 115 is detected to be executing as a foreground activity. In various embodiments, user engagement indication 124 may be sent as a response to receiving a notification from server system 120. The user engagement indication 124 indicates to server system 120 that the user of client device 110 has provided some indicia of user engagement with the chat session. The user engagement indication 124, in conjunction with chat representative availability, facilitates the initiation of authentication of the user of client device 110 by server system 120.

Authentication service 140, in various embodiments, is hardware, software, or a combination thereof capable of performing an authentication of the user of the client device 110. When server system 120 initiates an authentication of a user of a client device 110, server system 120 indicates the type of authentication challenge to generate to authentication service 140. Based on the initiation, authentication service 140 may cause a web page to be served on the client device 110 including an authentication challenge to the user to provide authentication credentials (for example, a SMS OTP to be responded to within a specific time period, say 5 minutes) to the authentication service 140. In some embodiments, authentication service 140 may sign the authentication challenge with a private key of a public-key pair and may distribute the corresponding public key to the client device 110 to enable the client device 110 to verify the authentication challenge. In others embodiments, authentication service 140 may sign the authentication challenge using a keyed-hash (e.g., HMAC).

Chat representatives 150 are humans responsible for handling details of various chat sessions. Server system 120 interfaces with chat representatives 150 to relay the requests for service received by server system 120 from various users. Chat representative 150 provides assistance to the user in handling of the user's request for service 122.

As illustrated in FIG. 1, a user of client device 110 sends a request for service 122 to the server system 120 after initiating a chat session with server system 120. Chat session module 118 on client device 110 is responsible for initiating the chat session with server system 120, and also for sending the request for service 122 to server system 120. Upon receiving the request for service 122, server system 120 queues the request for service 122 in a processing queue while waiting for one of multiple chat representatives 150 to become available. In various embodiments, server system 120 may assign multiple users to be handled by a single chat representative 150, since the nature of asynchronous communication makes it suitable for a particular chat representative 150 to be able to handle asynchronous chat sessions with more than one user at the same time.

As noted, server system 120 may be configured to handle a large number of requests for service from users of multiple client devices 110 to provide a chat session service to the users. The number of chat representatives 150 available for handling of asynchronous chat sessions with users is limited, and thus can lead to a delay in a chat representative being available to handle the user's request for service 122. Server system 120 may optionally indicate a predicted length of wait time to the user of client device 110 based on the current length of the processing queue, and also based on the number of chat representatives that are potentially available to handle the user's request for service 122. During this period of waiting, the user of client device 110 may disengage from the chat session.

When a chat representative 150 becomes available, then server system 120 may utilize an interface to assign a particular chat session to a particular chat representative 150. In some embodiments, upon a chat session being assigned or in response to a chat representative becoming available, the server system 120 interacts with client device 110 to determine user engagement. As noted, due to potentially long wait times, the user of client device 110 may not be currently be engaged with the chat session. The client device 110 sends a user engagement indication 124 to server system 120 upon detecting that the user of client device 110 has reactivated engagement with the asynchronous chat session. Chat representative availability and receipt of a "positive" user engagement indication 124 may constitute a readiness condition that can be used to trigger initiation of user authentication.

In various embodiments, user authentication may involve a selection of one of multiple possible authentication types for a user. In some cases, this selection may be performed by a module external to server system 120; in other cases, this selection may be performed by server system 120. If performed by server system 120, this authentication type selection may be performed at various times—for example, upon receipt of the request for service or upon the readiness condition being met. In some cases, server system 120 may implement the possibility of stepped-up authentication. For example, authentication type selection may be based on a rule-based recommendation vector stored by or accessible to system 120. This vector can provide rules for changing the authentication challenge based on the passage of time, for example, a difference in time from the time of receiving the request for service and the time of determining the readiness condition. For example, system 120 might select a particular authentication type upon receipt of the request for service, and then change this selection based on the supplied rule-based recommendation vector. This would permit, for example, the system to implement a much stricter authentication challenge if a long period of time passes between the request for service and determining that the readiness condition is satisfied.

The techniques illustrated in FIG. 1 allow server system 120 to determine the timing of initiation of the authentication challenge for the user of client device 110 based on chat representative availability and an indicia of user engagement. Accordingly, the uncertainty of the timing of generation of the authentication challenge relative to the availability of chat representative 150 and the user of client device 110 may be reduced. This paradigm may lead to reduced failure rate of authentication of users due to timeouts while waiting for responses to authentication challenges.

Figure 2:
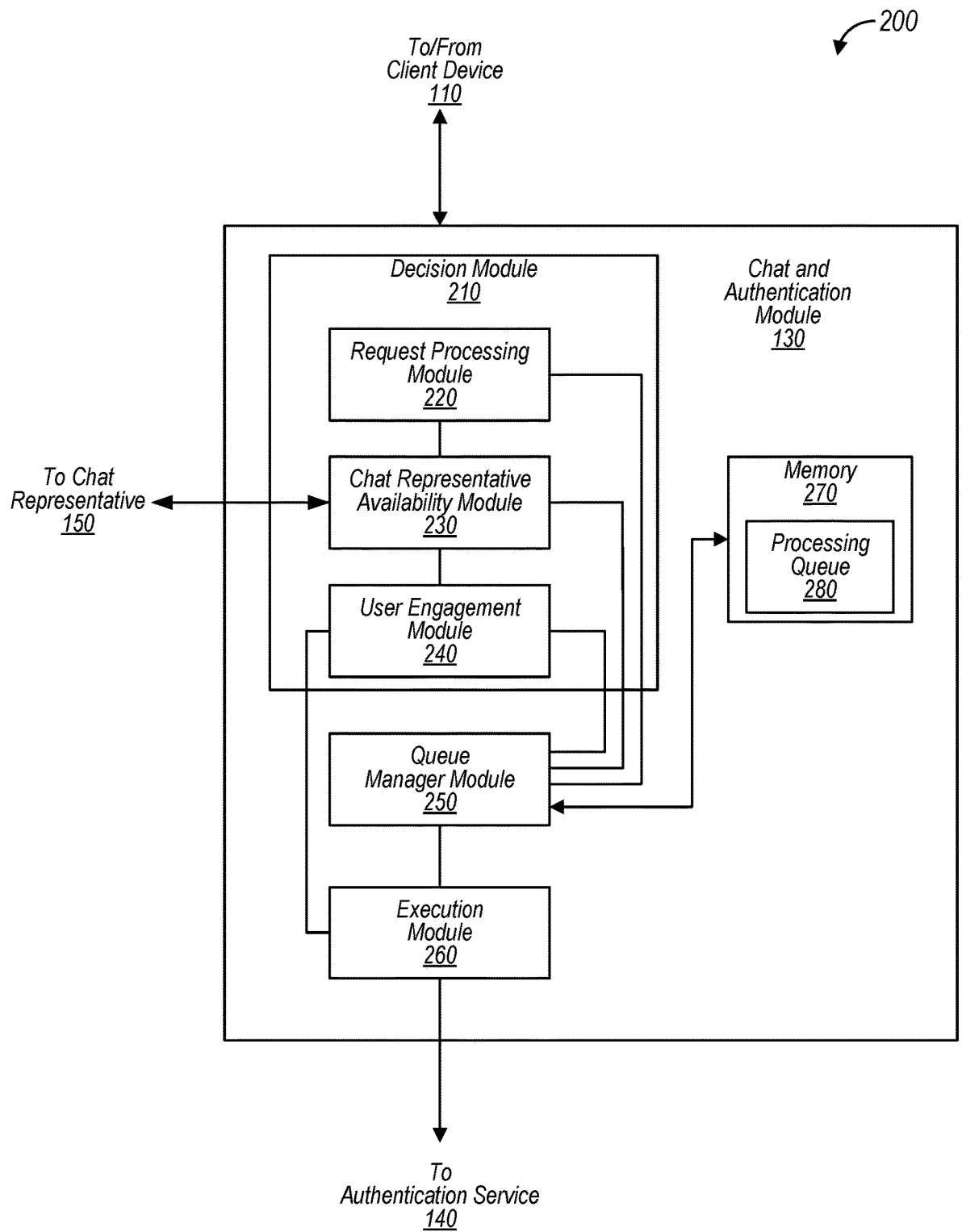
FIG. 2 is a block diagram of one embodiment of a server system that implements delayed authentication techniques.

Turning now to FIG. 2, a block diagram 200 of exemplary modules through which chat and authentication module 130 is implemented is shown. These modules include decision module 210, queue manager module 250, and execution module 260.

Broadly speaking, decision module 210 is executable to determine when a readiness condition is satisfied for a particular request for service stored in processing queue 280, which is managed by queue manager module 250. When a readiness indication is satisfied, decision module 210 can, in various embodiments, communicate this readiness to execution module 260, which may then cause a delayed authentication of a user to be initiated. As shown, decision module 210 may include various types of functionality. For example, decision module 210 may include a request processing module 220 for handling requests for services from client devices, a chat representative availability module 230 for determining when a chat representative is available for a particular request for service, and a user engagement module 240 that determines whether there is an indicia of engagement for a particular request for service for which a chat representative is available.

Request processing module 220 is a module that receives a request for service 122 message from client device 110 (which is associated with a user of client device 110). Besides request for service 122, request processing module 220 receives other messages from client device 110. For example, request processing module 220 receives messages that indicate the initiation or closing of a chat session. Request processing module 220 communicates with queue manager module 250 to add an entry for the request for service 122 in processing queue 280 (with processing queue 280 being placed in memory 270) while waiting for a chat representative 150 to become available to handle the request. Within request for service 122 message, there may be an indication of the type of request in the message, as well as textual metadata that identifies a more detailed reason for the request provided by the user of client device 110. Request processing module 220 may pass on this information to chat representative availability module 230 for further processing by chat representative 150, as explained below Chat representative availability module 230 is executable to provide an interface between chat and authentication module 130 and chat representatives such as chat representative 150. Chat representative availability module 230 monitors availability status information (whether a particular representative is ready or not to handle the request for service at the top of processing queue 280) of each of multiple chat representatives that are potentially available to process requests for service 122 received from multiple users of client devices 110. Chat representative availability module 230 may use queue manager module 250 to update various fields in the entry in processing queue 280 corresponding to a particular request for service 122. Once a chat representative 150 becomes available, chat representative availability module 230 communicates with user engagement module 240 to further the processing of the request for service 122.

User engagement module 240 is executable to ascertain engagement or readiness of the user of client device 110. Due to the unpredictable delay in assigning the request for service 122 to a particular chat representative 150, it is possible that the user of client device 110 may have disengaged from the asynchronous chat session. In one embodiment, user engagement module 240 sends a notification to the user of client device 110 to resume engagement with the chat service. Upon detecting engagement of the user with the asynchronous chat session (this detection may take multiple forms as described below) user engagement module 240 updates the entry for the particular request for service 122 for the user that has resumed engagement with the chat session, with the help of queue manager module 250. User engagement module 240 also communicates with execution module 260 to help initiate an authentication of the user of client device 110 before the requested service is provided to the user.

Execution module 260 is executable to actually cause initiation of the delayed user authentication. In some embodiments, execution module 260 may make a determination of the type of authentication challenge to present to the user of client device 110. Execution module 260 may, in some instances, communicate with queue manager module 250 to modify or read the entries in processing queue 280 in order to determine the authentication challenge type for the user of the particular request at the top of processing queue 280. An explanation of possible fields in a particular row of an entry in processing queue 280 is provided next with reference to FIGS. 3A-B.

Figure 3:
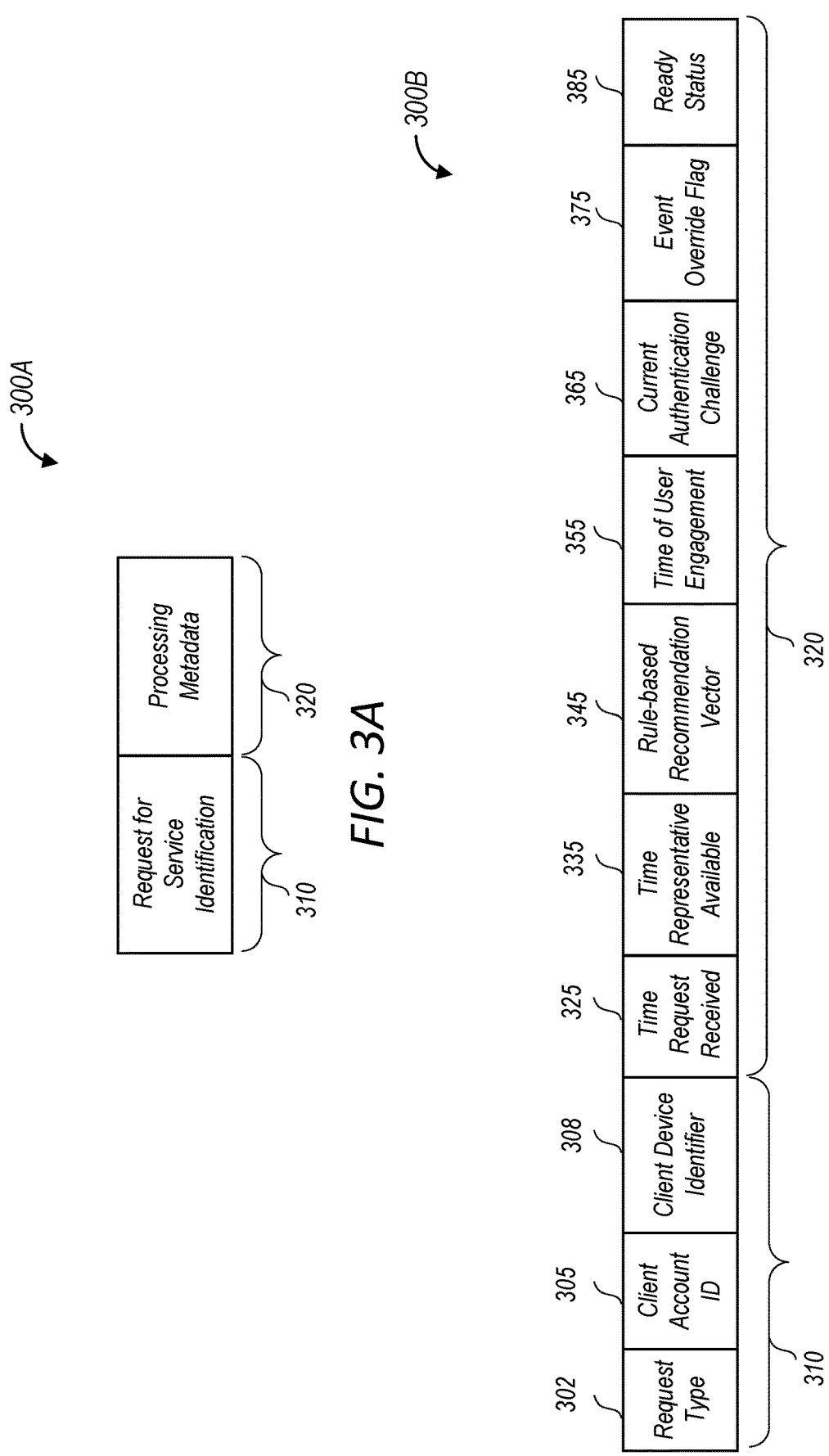
FIGS. 3A-B illustrate, respectively, broad categories and specific examples of data that may be part of a data structure that is stored in a queue in order to implement delayed authentication of a user.

Turning now to FIG. 3A, a diagram illustrating an example entry 300A in processing queue 280 is shown. A given entry in processing queue 280 corresponds to a particular request for service 122, and may be broadly considered to include a request for service identification 310, and a processing metadata 320. Service identification includes information associated with the request itself, as opposed to information generated in processing of the request by server system 120, which corresponds to processing metadata 320. Examples of various fields that might make up these two parts of an entry in processing queue 280 are described next with reference to FIG. 3B.

Turning now to FIG. 3B, an example 300B is shown with various example fields in each of the two parts of an entry in processing queue 280. As depicted, request for service identification 310 includes a number of fields. These fields include request type 302, client account identification (ID) 305, and client device identifier 308. Request type 302 identifies, at a high-level, the type of the request for service. In one embodiment, request type 302 may correspond to a menu option selected by the user of client device 110 on a user interface on the device. Request type 302 may be used for an initial determination of the authentication type for the user for the request. Client account ID 305 is used to identify an account for the user on server system 120. As described below, this field may be used to correlate intervening security events occurring on the same user account identified by client account ID 305 in order to step-up the authentication challenge to a stricter type of challenge in case of occurrence of intervening security events while a request for service is pending execution by server system 120. Client device identifier 308 is a field that identifies a device identifier to which a specific type of authentication challenge may be sent. For example, in case of a multi-factor authentication challenge being chosen for the user, client device identifier 308 may be a mobile phone number associated the user to which a SMS OTP challenge may be sent. Client device identifier 308 can also take other forms, such as a network address, etc.

Also depicted in FIG. 3B are fields that may be included in processing metadata 320. This information is gathered and generated by server system 120 while handling the request for service, and can take various forms. Examples of these fields include time request received 325, time representative available 335, rule-based recommendation vector 345, time of user engagement 355, current authentication challenge 365, event override flag 375, and ready status 385. The use of these fields under processing metadata 320 is explained further with respect to subsequent figures.

Figure 4:
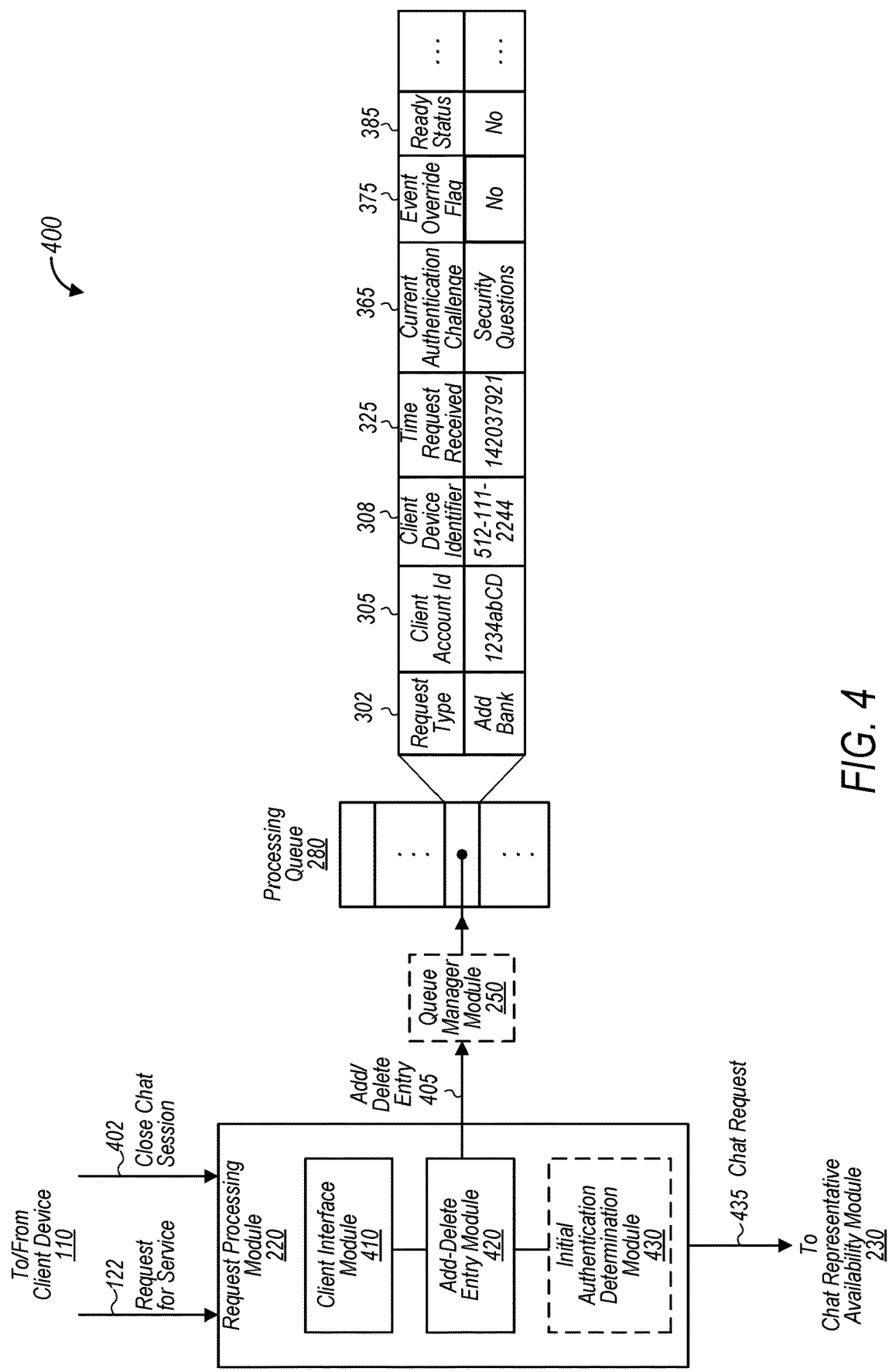
FIG. 4 depicts how various fields in a particular entry in a processing queue may be handled by one embodiment of a request processing module within a server system in response to receiving a request for service.

Turning now to FIG. 4, an example 400 is depicted to show how various fields in a particular entry in processing queue 280 may be modified by various modules included in request processing module 220. Example modules of request processing module 220 include client interface module 410, add-delete entry module 420, and initial authentication determination module 430. (The delineation of these modules of module 220 is meant to be an example and not to suggest this is the only possible implementation of module 220). Client interface module 410 is executable to receive various messages from the user of client device 110 that relate to starting a chat session, followed by a request for service 122 on the chat session. Client interface module 410 is also executable to receive a close chat session 402 message from the user, in the event that the user decides to terminate a chat session. Client interface module 410 communicates with add-delete entry module 420 to either add/delete entry 405 (the add entry occurs upon receiving a request for service 122 on a previously opened chat session, while the delete entry takes place upon receiving a close chat session 402). For example, while adding an entry in processing queue 280, add-delete entry module 420 uses queue manager module 250 to add the following fields to a new entry being added to processing queue 280 that corresponds to a particular request for service 122 received from a particular user. In the particular example shown, request type 302 is set to "Add Bank" as a specific type of request from a particular user, client account ID 305 is shown as "1234abCD" that corresponds to the account identifier for the user on server system 120, client device identifier 308 is shown as "512-111-2244" that corresponds to a mobile phone number for the user in case of a multi-factor authentication challenge (for example, SMS OTP), time request received 325 is shown as "142037921" that corresponds to the time that the particular request for service 122 was received from the user, event override flag 375 is set to "no" to indicate that no intervening security events have been detected after receiving the request. (Such events may, as described below, may necessitate a step-up in the authentication challenge for the user). Here, ready status 385 is set to "no" to indicate that the user for this particular request is not ready to be authenticated yet.

Initial authentication determination module 430, in some embodiments, determines an authentication challenge type to be presented to the user that initiated the particular request for service 122 based on the value of request type 302 field. In some embodiments, initial authentication determination module 430 may populate the current authentication challenge 365 field with the value of the initially determined authentication type—that is, what type of challenge is to be used to authenticate the user. Initial authentication determination module 430 communicates with chat representative availability module 230 to pass on a chat request 435 that includes similar fields included in the request for service 122. A chat request 435 may include textual metadata that contains a detailed reason provided for the user for the request for service 122 that may be passed on for interpretation by an available chat representative 150 in some embodiments.

Figure 5:
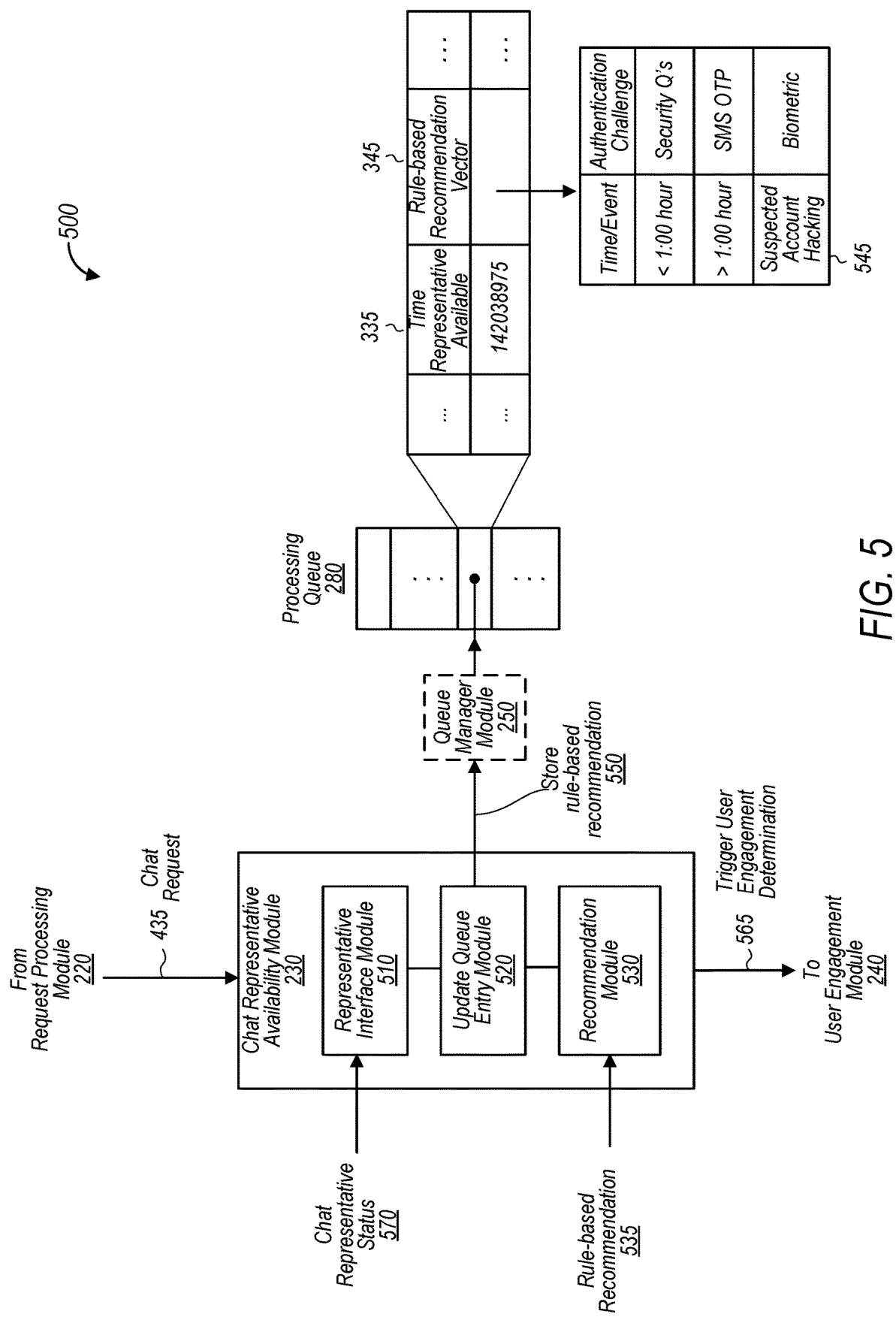
FIG. 5 depicts an example illustrating how various fields in a particular entry in the processing queue may be modified by one embodiment of a module in the server system that determines availability of a chat representative to begin a chat session.

Turning now to FIG. 5, an example 500 is depicted that shows how various fields in a particular entry in processing queue 280 may be modified by various modules included as part of chat representative availability module 230. Exemplary modules of chat representative availability module 230 include representative interface module 510, update queue entry module 520, and recommendation module 530. Representative interface module 510 is executable to monitor chat representative status 570—this is information that signifies whether a chat representative 150 is available to handle a particular user's request for service. Upon chat representative status 570 indicating that a chat representative is available, representative interface module passes on the previously received chat request 435 to the available chat representative. In some embodiments, chat representative 150 may send a chat authorization as a response to the chat request 435, with the chat authorization serving as an indication of the server system being available to process the request for service from the user. Chat authorization may not be used in some embodiments. As an alternative, chat representative status 570 by itself might serve as an indication to look for user engagement subsequent to the chat representative being indicated as available.

In some embodiments, recommendation module 530 is a module that is executable to determine an initial authentication type. This may be based on a rule-based recommendation 535 supplied by system 100 or by chat representative 150. This recommendation may be a table of recommendations in some implementations. As an example, table 545 shows various rows, each indicating a passage of time or occurrence of an event on the user account, as well as a corresponding type of authentication challenge to be performed.

Update queue entry module 520, in one embodiment, is executable to receive information from recommendation module 530 and representative interface module 510. Upon representative interface module 510 indicating chat representative availability and recommendation module 530 indicating an initial recommendation, update queue entry module 520 is executable to write, via queue manager module 250, an entry (e.g., store rule-based recommendation 550) corresponding to the request for service to processing queue 280. For example, such an entry might include a timestamp in time representative available 335 field indicating the time the chat representative is available, as well as authentication challenge information in table 545. As shown, information in table 545 may include various rules for setting the authentication challenge type based on the passage of time. Information in the entry that is written can subsequently be used when user engagement is detected. Various types of user engagement detection are discussed now with respect to FIGS. 6A-B.

Figure 6A:
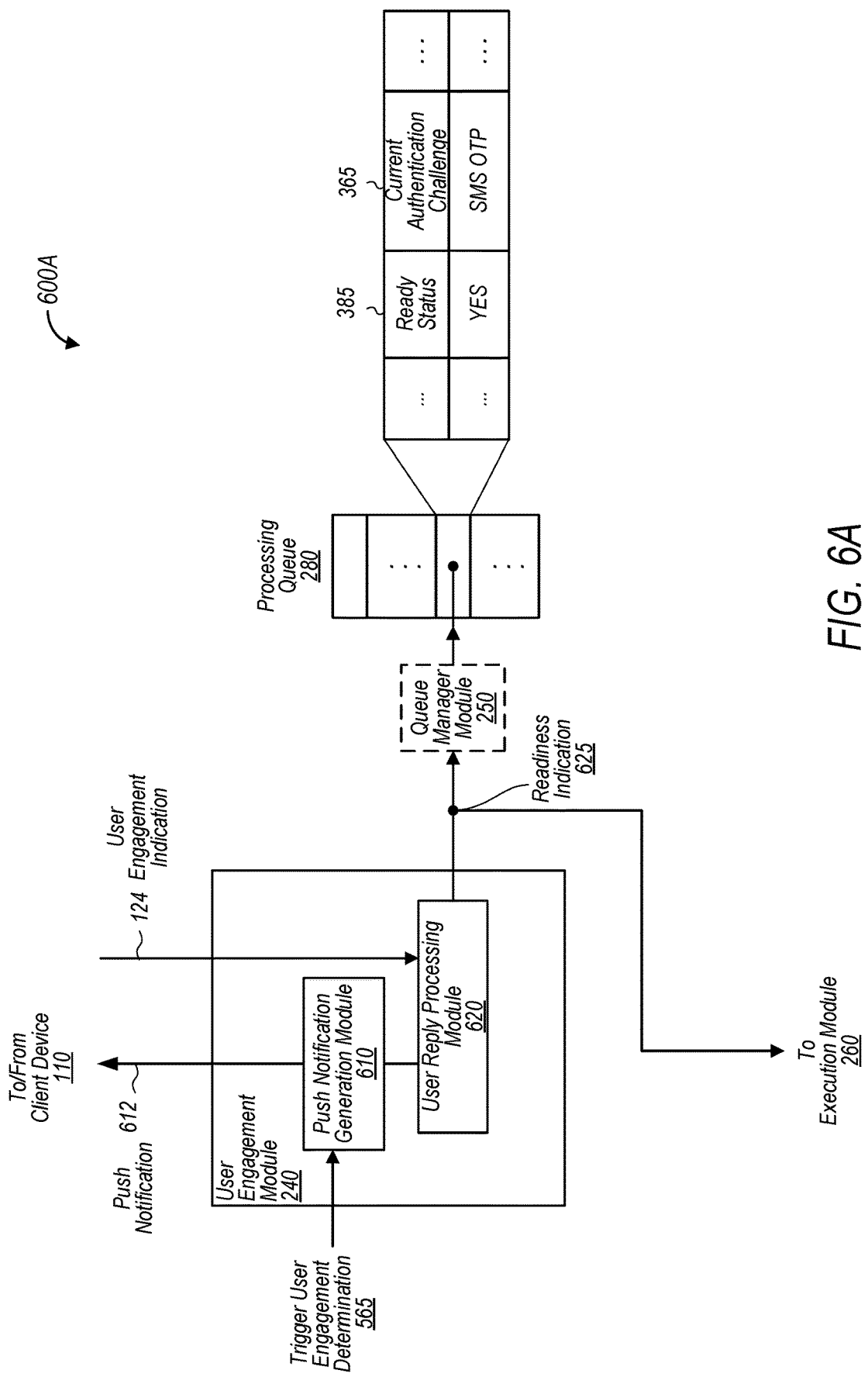
FIG. 6A shows one embodiment in which detection of user engagement is facilitated through a user engagement module at the server that generates a push notification to a user.

Turning now to FIG. 6A, an example embodiment 600A of detecting user engagement through a user engagement module 240 is shown. In one embodiment, user engagement module 240 is implemented using a push notification generation module 610 and a user reply processing module 620. Upon receiving trigger user engagement determination message 565 (from chat representative availability module 230), push notification generation module 610 sends an explicit push notification message 612 to client device 110. When client device 110 sends a response in the form of a user engagement indication 124 (various forms of which are described below with reference to FIGS. 10A-C), user reply processing module 620 processes the indication. In response to engagement with the user being detected, user reply processing module 620 generates a readiness indication 625 for queue manager module 250. Based on readiness indication 625, queue manager module 250 may update, in one embodiment, various fields in a particular entry in processing queue 280. For example, ready status 385 may be set to "yes" to indicate that the user corresponding to the particular entry is now ready to be authenticated, and current authentication challenge 365 may be set to a particular authentication challenge type. In some embodiments, this authentication type may be determined by applying information in rule-based recommendation vector field 345 to be based on the time difference between the current time and timestamp stored in time representative available 335 field. Note that in the present example, the event override flag 375 was not changed from an initial value of "no"; accordingly, the event-based rules in rule-based recommendation vector 345 are not applied. It may be noted that in other embodiments, the passage of time may be calculated to be the difference between the time that user engagement is detected and the time when the request for service was first received. In other words, various techniques for measuring the passage of time may be utilized in order to determine how to process a particular request for service.

Figure 6B:
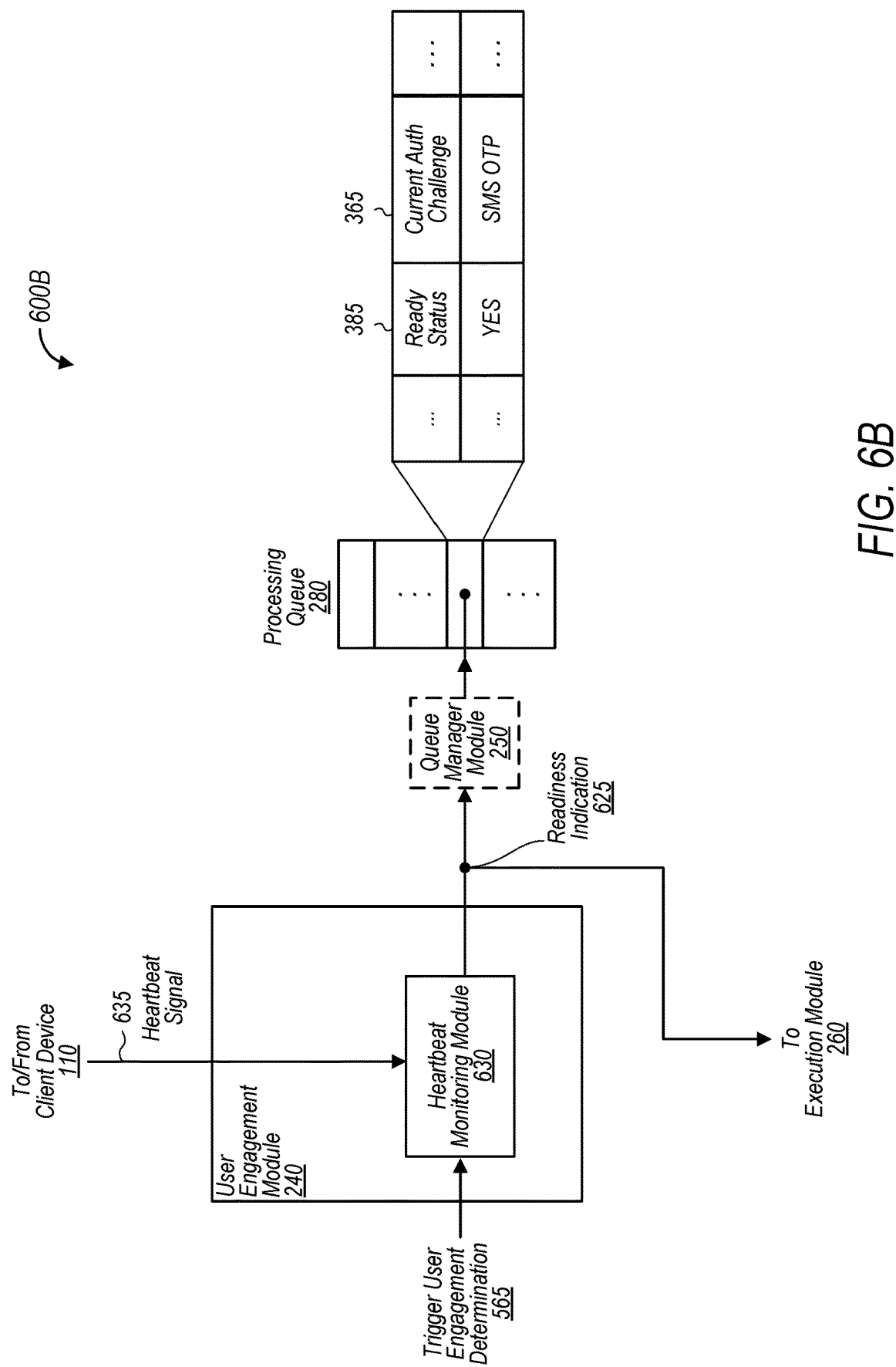
FIG. 6B shows an alternate embodiment in which user engagement is facilitated through a user engagement module at the server that monitors a heartbeat signal from the client device.

Turning now to FIG. 6B, an alternate embodiment 600B of detecting user engagement through a user engagement module 240 is shown. In some embodiments, user engagement module 240 may not send a push notification to client device 110 in response to an indication of a chat representative being available. In such embodiments, a heartbeat monitoring module 630 may be configured to monitor a periodic heartbeat signal 635 that is sent by client device 110. Heartbeat monitoring module 630 is executable to generate a readiness indication 625 message for queue manager module 250 upon receiving an initial heartbeat signal 635 after receiving the trigger user engagement determination message 565. In this manner, the initiation of the authentication challenge for the user is coordinated by the server system in response to detecting that both a chat representative is available and some indicia of user engagement is determined. This paradigm is intended to increase the chances that an authentication is successfully completed within a particular time period after initiation.

Figure 7:
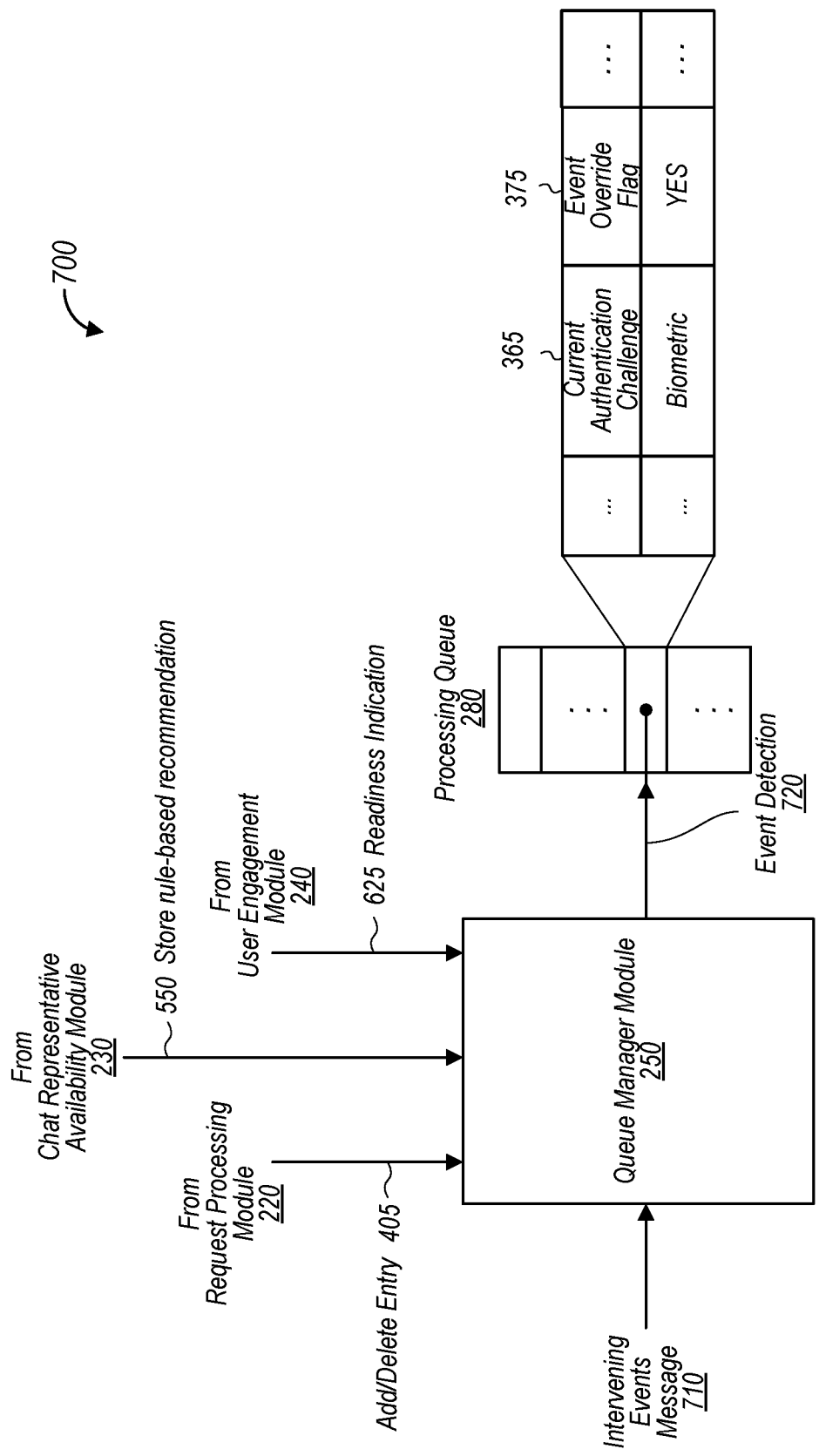
FIG. 7 illustrates an embodiment of a queue manager module that handles updates to entry in a queue at the server system that stores information about pending requests for service that need authentication.

Turning now to FIG. 7, an example 700 of an embodiment of queue manager module 250 is shown in which intervening events are detected and acted upon by queue manager module 250. As described with reference to previous figures, queue manager module 250 is executable to handle specific messages sent to it by different modules and operate on particular fields of an entry in processing queue 280 based on the specific message. Examples of such messages previously discussed include add/delete entry 405, store rule-based recommendation 550, and readiness indication 625. Queue manager module 250 is also executable to handle an intervening events message 710. The indication of intervening events may be generated by external modules that detect occurrence of security events relating to a user's account, such as a breach of a particular user's account. In some cases, the intervening events may correspond to a general period of vulnerability or alert when large-scale security events are known to be occurring. Upon receiving intervening events message 710, queue manager module 250 determines whether the message applies to a particular user account. If that is the case, then an event detection 720 is determined to have occurred for a particular user's request for service that is pending in processing queue 280. In such a case, queue manager module 250 determines the entry corresponding to the user account in processing queue 280 and then modifies certain fields in the row in processing queue 280 that corresponds to the particular request for service. In the specific example of FIG. 7, intervening events message 710 may lead to a determination of a stepped-up authentication challenge of "biometric" being applied to current authentication challenge 365 field of the row in processing queue 280. Event override flag 375 may be set to "yes" to indicate that an intervening event has occurred that has caused the authentication challenge type to be stepped-up to a relatively stricter challenge type.

Figure 8:
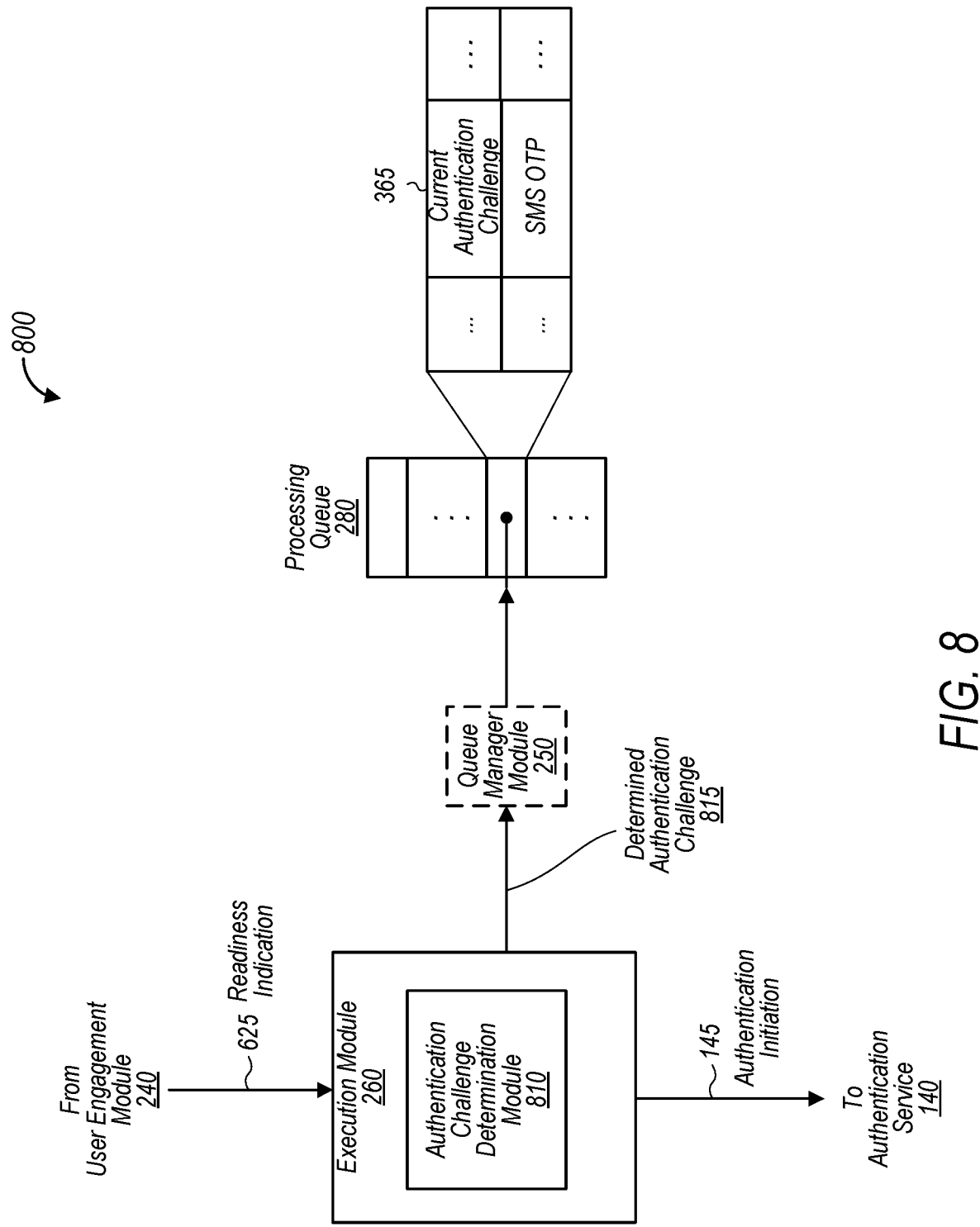
FIG. 8 depicts an embodiment in which an authentication challenge type is determined for a user by an execution module at the server system.

Turning now to FIG. 8, an example 800 depicts how execution module 260 might determine an authentication challenge type for a particular user. Execution module 260 includes an authentication challenge determination module 810 that is executable to receive a readiness indication 625 message. Upon receiving the message, authentication challenge determination module 810 is configured to use queue manager module 250 to process various fields in a particular entry corresponding to the particular user for whom an authentication challenge has to be determined. In one embodiment, authentication challenge determination module 810 first checks the event override flag 375. If the flag is set to "yes," then, as mentioned previously, authentication challenge determination module 810 skips any further determination of an authentication type. If the event override flag 375 is set to "no", then authentication challenge determination module 810 may apply a policy such as that specified in rule-based recommendation vector 345. In some cases, authentication challenge determination module 810 may apply the rule that corresponds to the passage of time indicated by the difference between the time of receiving readiness indication 625 (indicative of user engagement after server system becomes available to handle user's request) and the timestamp indicated in the time representative available 335 field. The difference may indicate the passage of time between the time that a chat representative 150 became available to handle user's and the time of detection of user engagement. Authentication challenge determination module 810 then applies the authentication challenge, such as that specified in rule-based recommendation vector 345, to the corresponding passage of time to generate a determined authentication challenge 815. For example, authentication challenge determination module 810 interfaces with queue manager module 250 to change the current authentication challenge 365 field from "security questions" in FIG. 4 to "SMS OTP" in FIG. 8. Note that in some cases, there may not be an initial authentication type determination; instead, the determination of the authentication type may not happen at all until readiness indication 625 is received. This determination can be based on a policy for the user that also takes into account the passage of time or any intervening security events on the user's account.

Figure 9A:
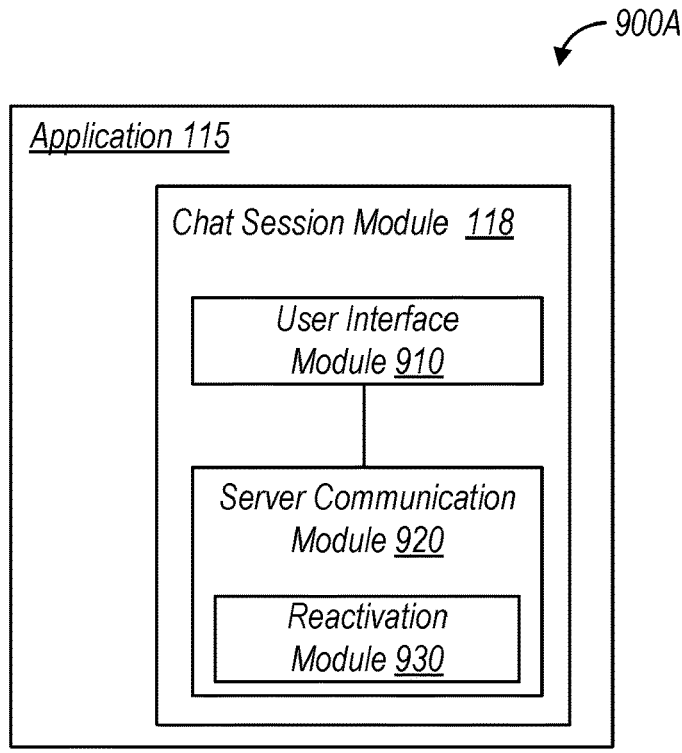
FIG. 9A is a block diagram illustrating components of one embodiment of an application executing on a client device for initiating and conducting a chat session.

Turning now to FIG. 9A, a block diagram of a system 900A for implementing a chat session on a client device is shown. In the illustrated embodiment, system 900A includes application 115 executing on a client device. Application 115 is a module that may have various features, one of which is to support communications such as a chat session with server system 120. To this end, application 115 includes a chat session module 118. Chat session module 118 is executable to facilitate the maintenance and continuation of a chat session between the user and the server system. Chat session module may, in one embodiment, include a user interface module 910 and a server communication module 920. User interface module 910 is executable to provide multiple display screens or view on the display of the user device to provide a user interface. A few examples of possible display screens that may be provided by user interface module 910 are shown in FIGS. 9B-C below.

Server communication module 920 is executable to communicate messages between the client device and the server system, including messages for initiating and closing chat sessions, and messages relating to requests for service from the server system. Server communication module 920 includes a reactivation module 930 that is executable to interact with the server system in order to indicate that the user of client device has re-engaged with the chat session. The role of reactivation module 930 in facilitating user engagement detection by the server system is illustrated with reference to FIGS. 10A-C below.

Figure 9B:
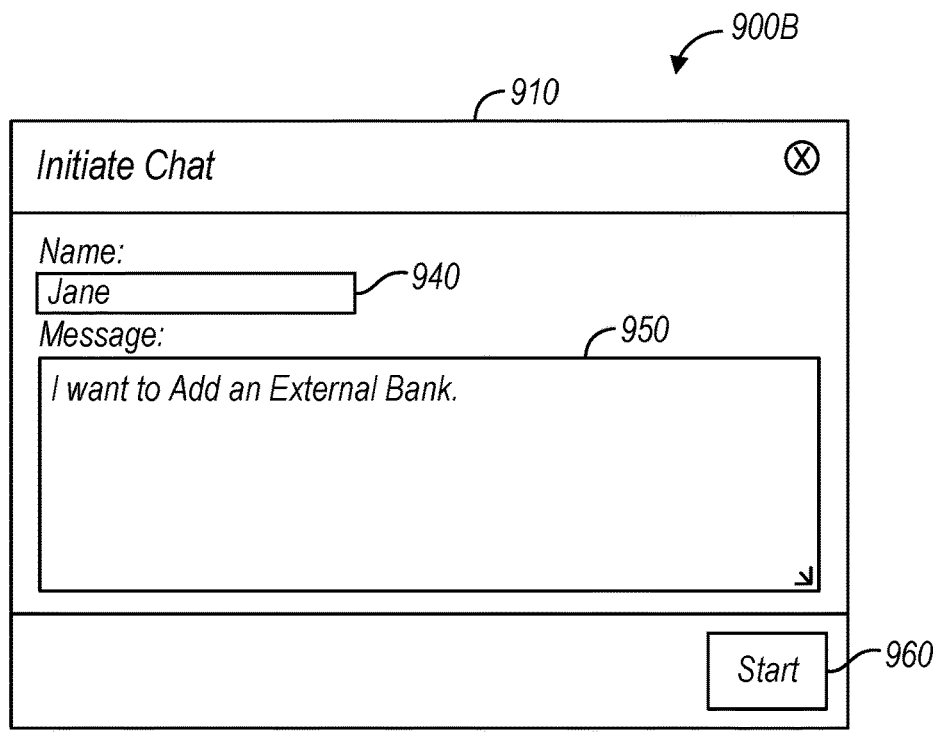
FIG. 9B shows an example of a display on the screen of a client device for initiating a chat session.

Turning now to FIG. 9B, an example 900B of a display on the screen of the client device provided by user interface module 910 is shown. The specific example in FIG. 9B is a display to initiate a new chat session. As depicted, there is a name field 940 for the user to enter her name. Here, the user has typed the following message in message field 950: "I want to add an external bank." The user interface module 910 also has a start button 960 for the user to initiate a chat session with the server system.

Figure 9C:
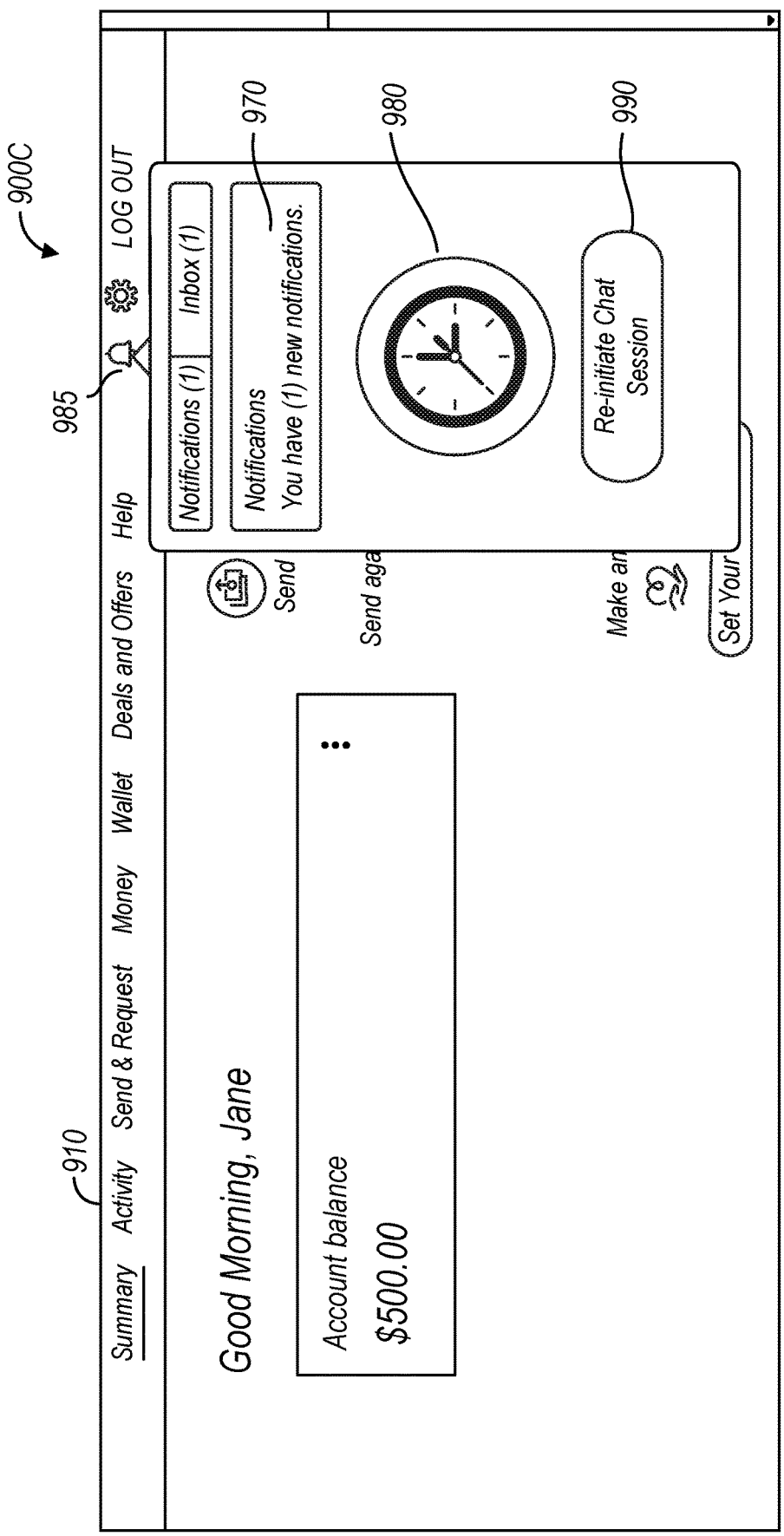
FIG. 9C shows an example of a display on the screen of a client device that includes a notification to the user to re-initiate a chat session.

Turning now to FIG. 9C, an example 900C of another display on the screen of the client device provided by user interface module 910 is shown. In one embodiment, a client device receives a notification from the server system, with the notification serving as an indication to the user of the client device to re-engage with the chat session from which the user may have temporarily disengaged. As shown in FIG. 9C, the display has a bell icon 985 that provides a sound associated with receiving the notification, similar to how many apps on mobile phones provide an audio indication about the occurrence of events of interest to the app. There is a "notifications" display box 970 that indicates the number of messages that are available for the user of the client device to view that is set to 1 in the specific example shown. Also displayed is a visual clock 980 that provides a visual indication of the amount of time remaining for the user to respond to the notification. Finally, there is a "re-initiate chat session" icon 990 for the user to click to re-engage with the chat session. Icon 990 is one example of how user engagement may be detected in order to determine when to initiate user authentication. This and other examples of detecting user engagement are now described with respect to FIGS. 10A-C.

Figure 10A:
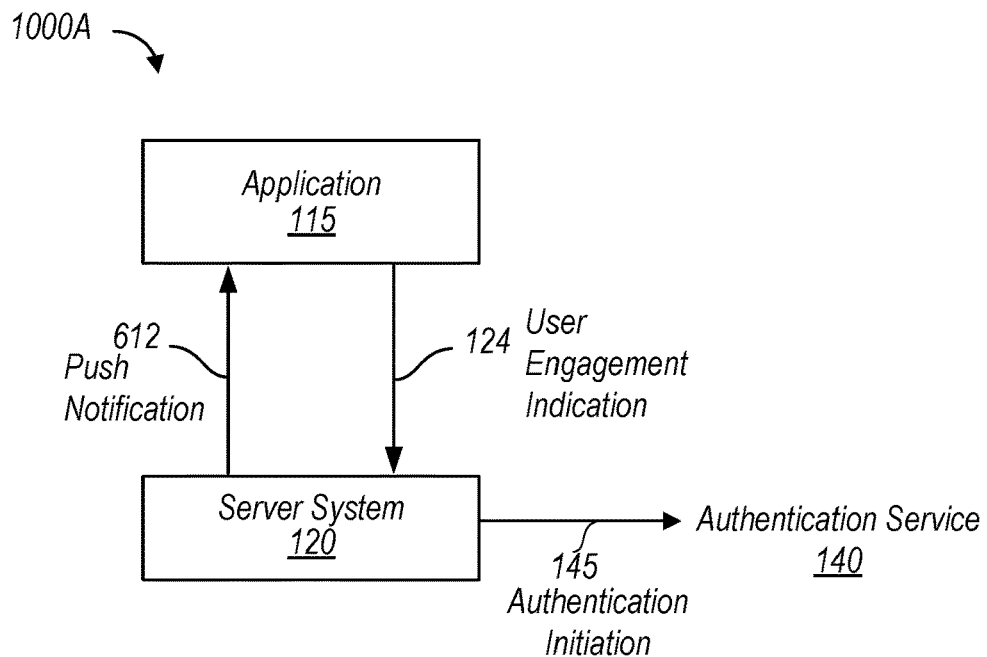
FIG. 10A is a block diagram of an embodiment in which user engagement is detected by a user response to a push notification.

Turning now to FIG. 10A, an example 1000A illustrating a client device sending an active reply for a user engagement indication 124 upon receiving a notification from a server system 120 is shown. As depicted, server system 120 generates a push notification 612 relating to the request for service. (As one example, push notification 612 may be generated in response to server system 120 receiving a chat authorization from an available chat representative, as discussed above with reference to FIG. 5). This notification may indicate that the chat representative is available and ask for a user response that the user wishes to continue with the chat session. In response to user input indicating this confirmation, application 115 sends a reply to the notification. This reply can be considered to be a user engagement indication 124. Having received the reply regarding user engagement, server system 120 then sends an authentication initiation message 145 to an authentication service 140 to commence the authentication of the user of the client device.

Figure 10B:
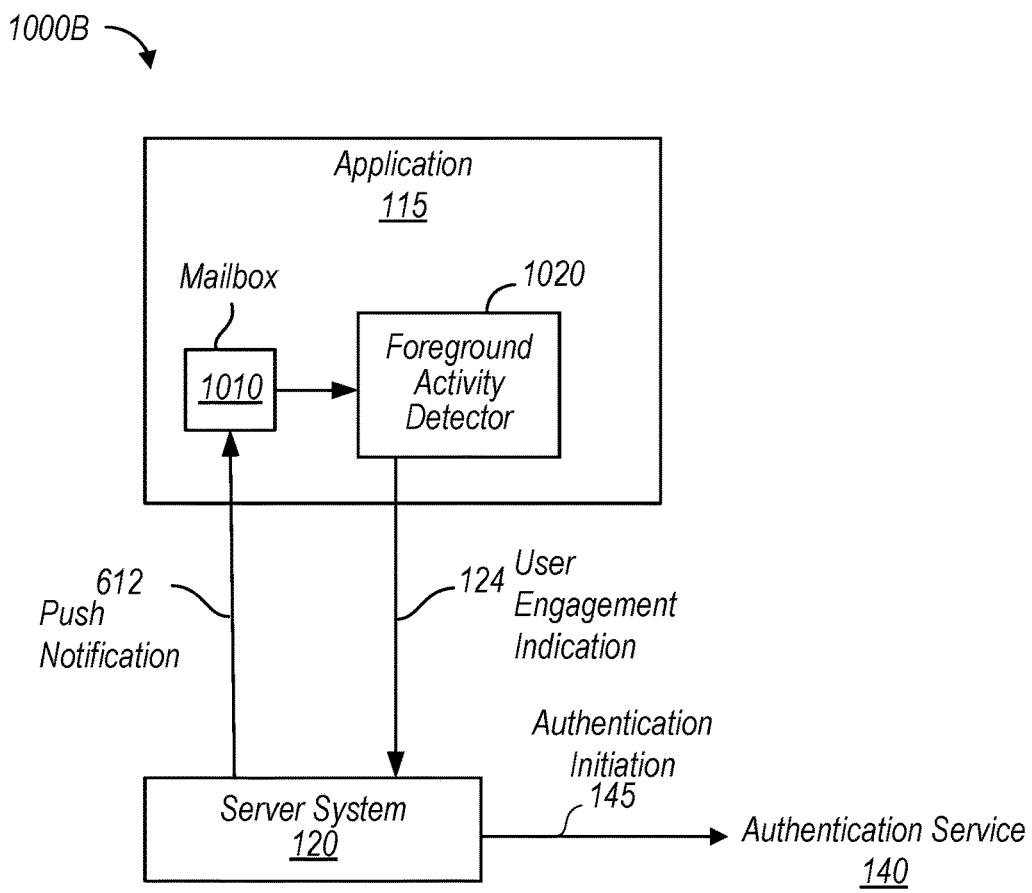
FIG. 10B is a block diagram of an embodiment in which user engagement is detected in response to a passive indication received from an application on the client device.

Turning now to FIG. 10B, a different form of user engagement is illustrated. As depicted, example 1000B shows an embodiment in which a client device sends reply to a push notification without requiring any affirmative action from the user. In FIG. 10B, server system 120 generates a push notification 612 and sends it to application 115 in a similar manner to the example of FIG. 10A. Here, push notification 612 may be stored in a location such as a mailbox 1010. Application 115 may have code (for example, foreground activity detector 1020) that operates whenever it is the "foreground" application. For example, a foreground application on a mobile device typically refers to the currently displayed application; on a desktop or laptop device, the foreground application may refer to the currently active window. In any event, upon detecting that application 115 is in a foreground mode, code such as foreground activity detector 1020 may execute to check the contents of mailbox 1010. If there is an indication of a push notification in mailbox 1010, foreground activity detector 1020 generates—without user involvement (and possibly without user knowledge)—a user engagement indication 124 and sends it to server system. Similar to the example of FIG. 10A, server system 120 then sends an authentication initiation message 145 to authentication service 140 to commence the authentication of the user of the client device.

Figure 10C:
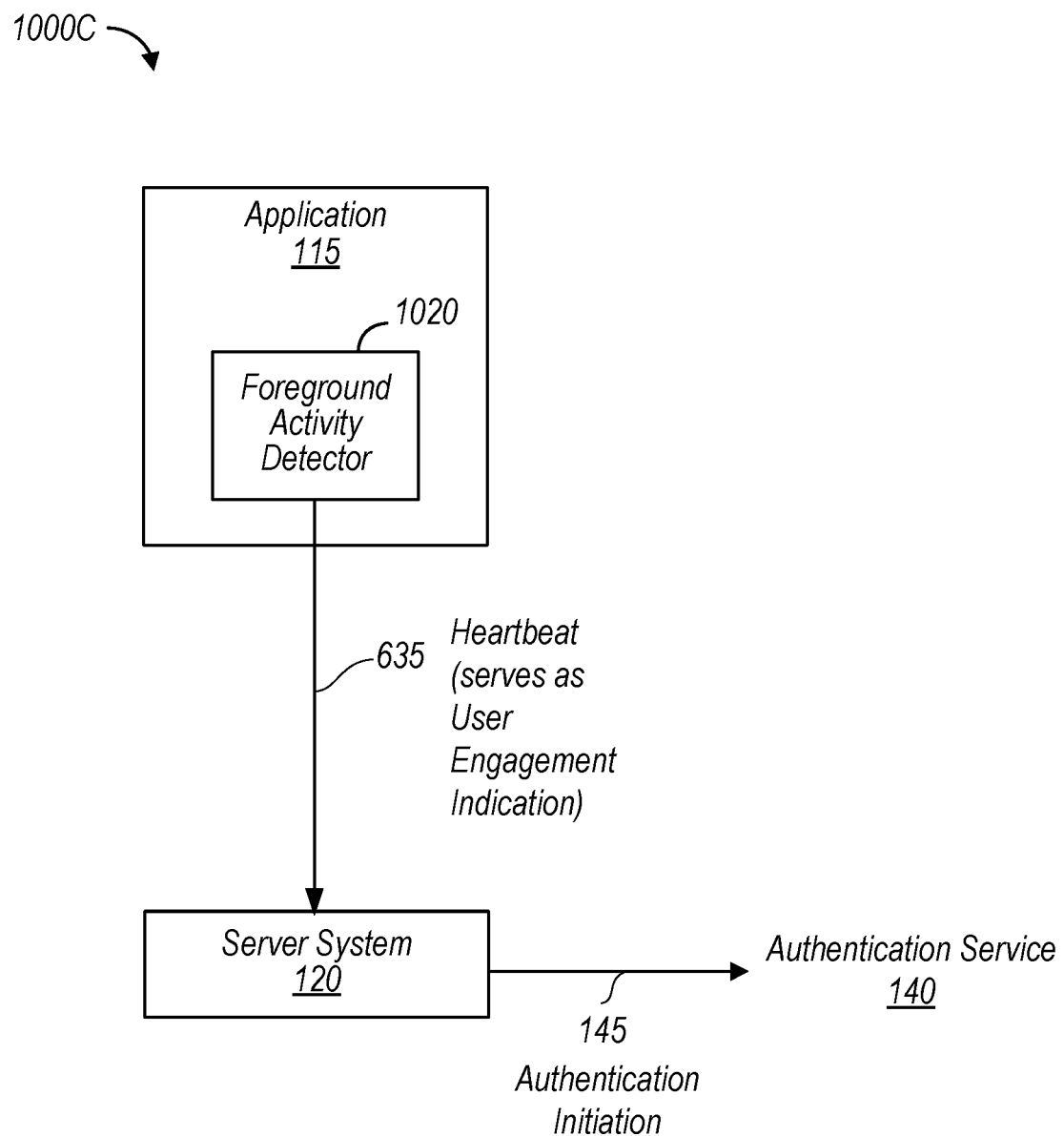
FIG. 10C is a block diagram of an embodiment in which the server system detects user engagement through a heartbeat mechanism.

Turning now to FIG. 10C, still another example of detecting user engagement is illustrated. As depicted, example 1000C shows how an indication of a user engagement might be generated through a heartbeat mechanism. In some embodiments, server system 120 does not send a notification to application 115. Rather, code such as foreground activity detector 1020 may periodically send a "heartbeat" signal to server system 120 without any prompting from server system 120. This signal may be sent, for example, whenever application 115 transitions from a dormant state to a foreground state. Additionally, this signal may be sent according to some regular period whenever application 115 is active. In this example, foreground activity detector 1020 generates a heartbeat signal 635 and sends it to server system 120. Server system 120, upon detecting the heartbeat signal 635 after determining a chat representative is available, treats the heartbeat signal 635 as a user engagement indication 124 message. In response to receiving heartbeat signal 635, server system 120 then sends an authentication initiation message 145 to authentication service 140 to initiate the authentication of the user of the client device.

FIGS. 10A-C thus provide various, non-limiting examples of how a server system might receive indications that a user is engaged.

Figure 11:
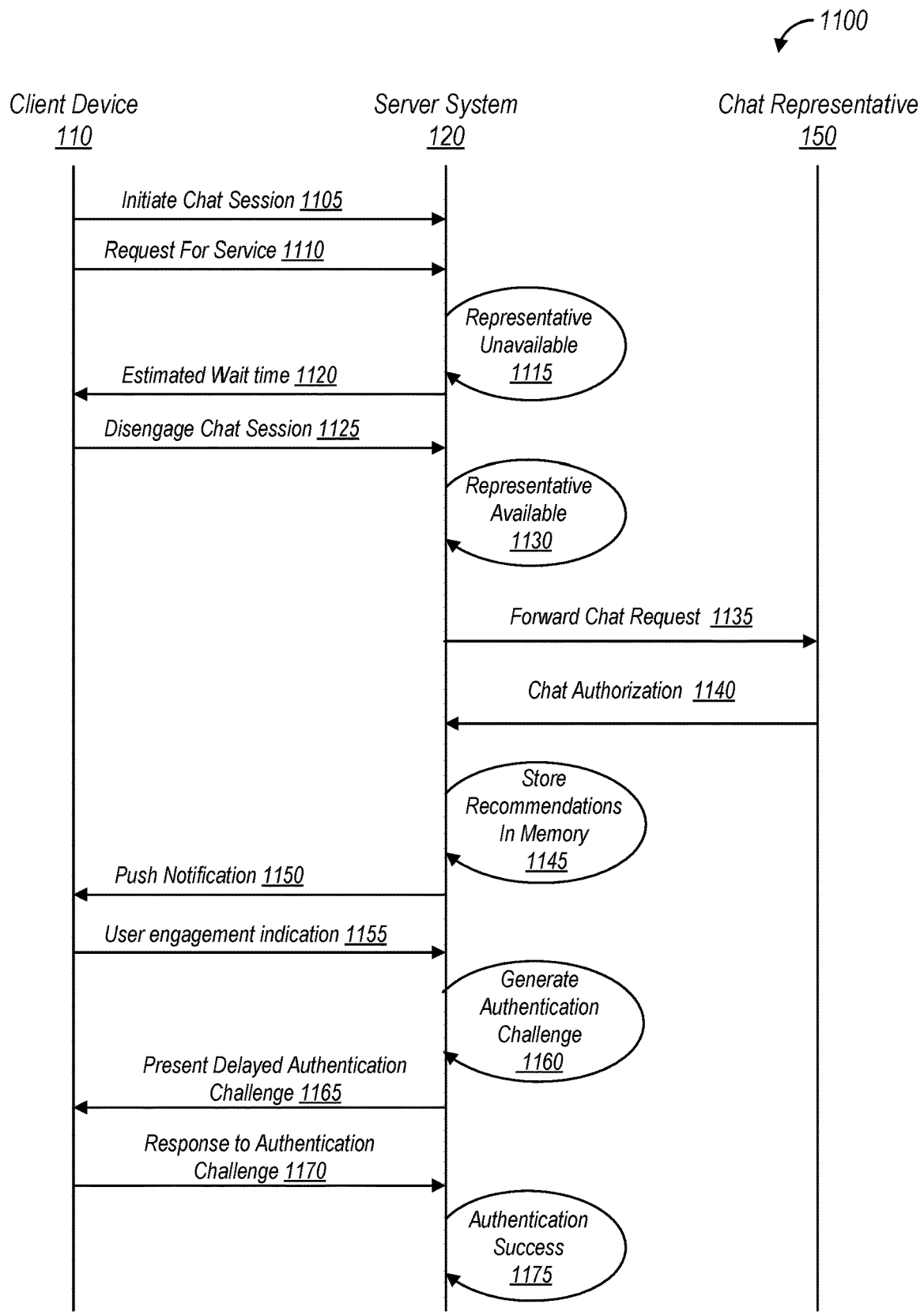
FIG. 11 shows a message sequence diagram illustrating an example interaction between the various components of a system that implements delayed authentication of a user.

Turning now to FIG. 11, a message sequence diagram 1100 illustrating the interaction between the various components of system 100 is shown to capture how delayed authentication of a user of client device 110 is implemented for a chat session. For purposes of this figure, authentication service 140 is considered to be part of server system 120 and is thus not shown separately. In some other embodiments, authentication service 140 may be separate from server system 120 and there may be additional interactions between server system 120 and authentication service 140 to facilitate the authentication of the user of client device 110.

At step 1105, client device 110 initiates a chat session with server system 120 (e.g., client device 110 sends a message to server system 120) to open a chat session with server system 120. At step 1110, client device 110 sends a request for service message to server system 120 (e.g., request for service 122). Server system 120, upon receiving the request for service, may make an initial determination of an authentication type for the user based on the type of request received from the user. For example, in one embodiment, the authentication type may involve asking security questions of the user that the user had previously saved in the user's profile available on server system 120, especially in cases in which the request is about read-only access to user's transaction data about ongoing or past transactions. In other embodiments, the authentication type may be a stricter, multi-factor authentication—for example, SMS OTP in case the user's request is for modification of user's profile information (e.g., change of beneficiary on the user's account).

At step 1115, server system 120 determines that a chat representative is not currently available to handle the request for service. Server system then stores the request for service in a processing queue. The request for service encounters a delay before being handled. At step 1120, in some embodiments, server system 120 provides an estimate of the wait time to client device 110. This estimate may be based on the length of the processing queue at the current time and also the number of chat representatives that are potentially available to handle requests for service. The user of client device 110 may temporarily disengage from the chat session, depending upon the estimated wait time provided at step 1120. In some cases, no wait time estimate may be provided.

At step 1125, client device 110 may disengage from the chat session. Note that disengagement from the chat session may not actually be communicated as such to server system 120; reference numeral 1125 simply indicates that disengagement may occur at this time.

At step 1130, the request for service reaches the top (or near the top) of the processing queue and a chat representative becomes available to handle the request for service. At step 1135, server system 120 forwards a chat request to the available chat representative. In one embodiment, the chat request may be substantially similar to the request for service received from client device 110, and may include textual metadata entered by the user of client device 110 that identifies a detailed reason for the request as a text to be interpreted by the chat representative.

At step 1140, server system 120 optionally receives a chat authorization from chat representative 150. The chat authorization indicates that chat representative 150 is ready to facilitate the handling of the request for service from the user. In some embodiments, the authorization may be based on a rule-based recommendation vector (e.g., the rule-based recommendation vector in the example described in FIG. 5 above).

At step 1145, server system 120 optionally stores, in the queue, a rule-based recommendation vector for later determining the type of authentication challenge based on the values stored in the vector.

At step 1150, server system 120 sends a push notification (for example, push notification 612) to client device 110. At step 1155, server system 120 detects some indicia of user engagement with the chat session. The detection may take place using any of the techniques for detecting user engagement described with reference to FIGS. 10A-C above. In some embodiments, server system 120 may receive a user engagement indication 124 from client device 110 as an indication that the user is available to receive and respond to an authentication challenge. Thus, the techniques of the present disclosure enable delaying the sending of an authentication challenge to the user until there is some indication that the user is engaged with the chat session. This paradigm can mitigate the problem of the user not being available to respond to the authentication challenge within a limited timeout period for certain types of authentication (e.g., SMS OTP challenge, or a biometric challenge).

Server system 120 makes a determination of an authentication type to be presented to the user of client device 110 and generates the authentication challenge in step 1160. In some embodiments, this determination may supersede an initial determination that had been made after the request for service is received at step 1110. Server system 120 may use the rule-based recommendation vector received at step 1140 to adapt the type of authentication challenge to be presented to the user. For example, before making a determination of the final authentication type, server system 120 first may check whether an event override flag (for example, event override flag 375) is set for the user's entry in the processing queue that indicates that an intervening security event had been detected for the user's account while the request for service was pending in the processing queue. If the event override flag is not set, then server system 120 may apply time-based criteria as provided in the rule-based recommendation vector by chat representative 150 in a manner similar to what has been described with reference to FIGS. 5 and 8 above).

At step 1165, server system 120 presents the final determined authentication type to the user of client device 110 as an authentication challenge. As alluded to previously, in some embodiments, server system 120 may interface with an authentication service to facilitate the authentication of the user. At step 1170, the user responds to the authentication challenge with a response. At step 1175, upon receiving a correct response to the challenge, the authentication process is deemed to be successful.

Figure 12:
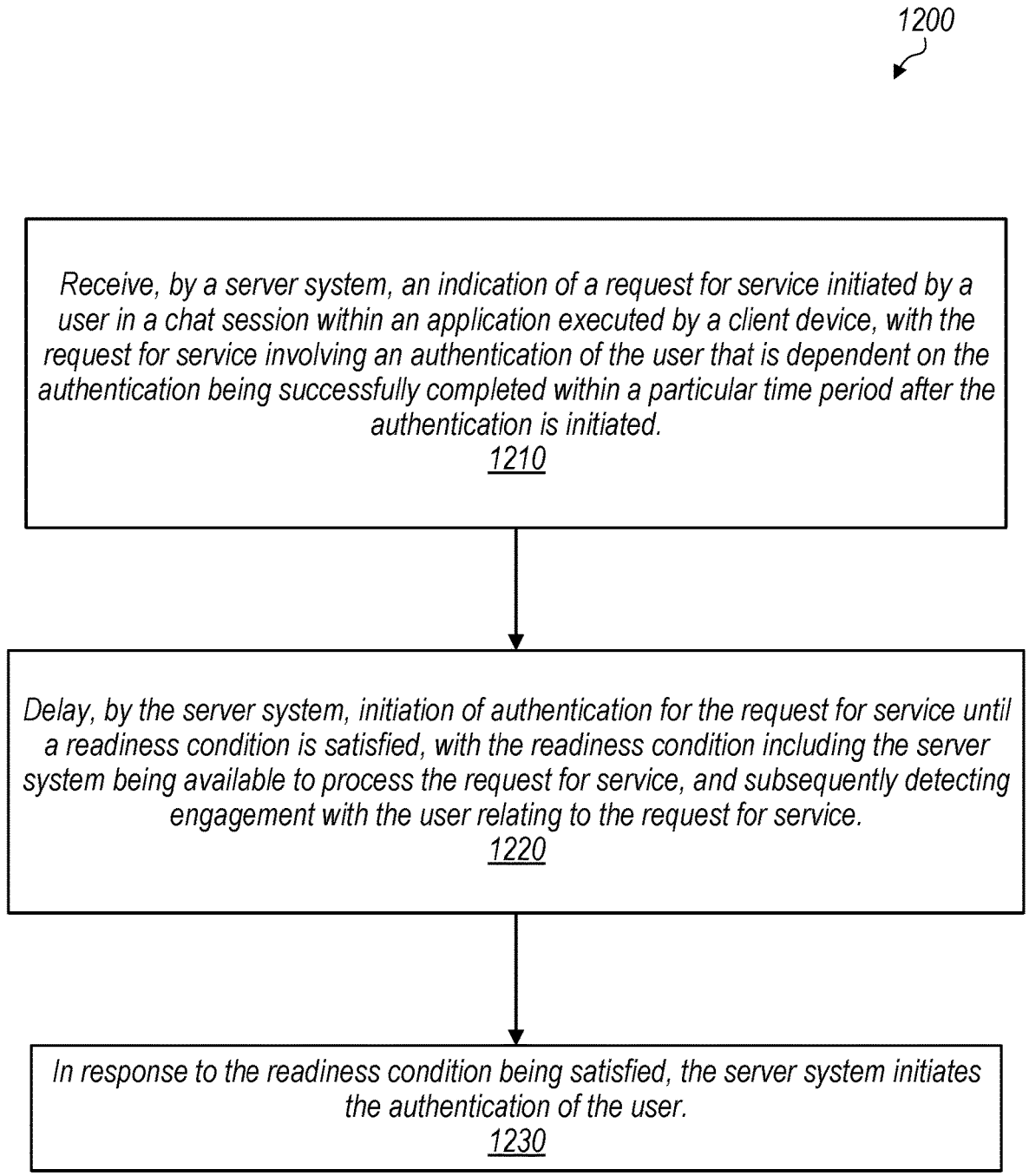
FIG. 12 illustrates a flowchart of one embodiment of a method implemented by a server system to perform delayed authentication of a user.

Turning now to FIG. 12, a flowchart of an example method 1200 implemented by a server system is shown. In the illustrated embodiment, at step 1210, the server system (e.g., server system 120) receives an indication of a request for service (e.g., request for service 122) initiated by a user in a chat session within an application executed by a client device (e.g., client device 110). The request for service involves an authentication of the user that is dependent on the authentication being successfully completed within particular time period after the authentication is initiated. Textual metadata may be included as part of the request for service that indicates a more detailed reason for the user's request for service than may be known from just the type of service in the request for service indication.

At step 1220, the server system delays the initiation of authentication for the request for service until a readiness condition is satisfied, in which the readiness condition includes the server system being available to process the request for service. The readiness condition also includes subsequently detecting engagement with the user relating to the request for service. Details about how the satisfaction of readiness condition may be determined have been discussed with reference to FIGS. 6A-B. The determination of readiness condition provides a suitable point for the initiation of the authentication challenge for the user of the client device since the user is determined to be in a condition to receive and respond to the challenge, thereby greatly reducing the chances of an authentication failure in case the authentication challenge had been presented to the client device without ascertaining the readiness condition. Note that the readiness condition does not guarantee that the user will receive the authentication challenge; rather, the readiness condition merely indicates that some indicia of user engagement is present, which increases the chance that the user will actually view the authentication challenge in a timely manner and act on the challenge.

At step 1230, the server system initiates the authentication of the user in response to the readiness condition being satisfied. The timing of initiation of the authentication challenge having been determined by the readiness condition at the previous step, this step initiates authentication of the user of the client device.

Figure 13:
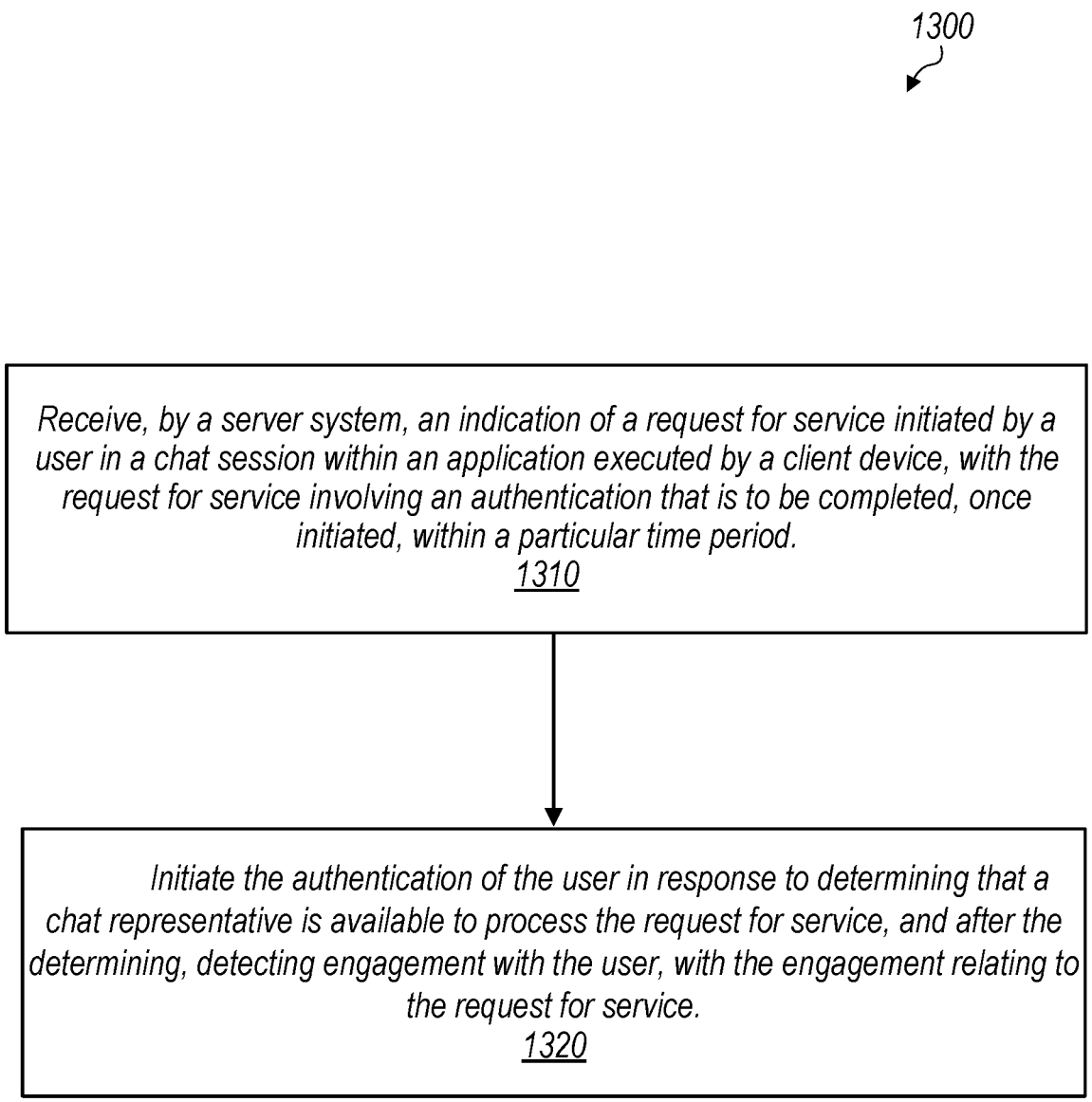
FIG. 13 illustrates a flowchart of an alternate embodiment of a method implemented by a server system to perform delayed authentication of a user.

Turning now to FIG. 13, a flowchart of method 1300 implemented by a server system is shown. Method 1300 has similarities and overlap to method 1200 described with respect to FIG. 12. At step 1310, the server system (e.g., server system 120) receives an indication of a request for service (e.g., request for service 122) initiated by a user in a chat session within an application executed by a client device (e.g., client device 110). The request for service involves an authentication that is to be completed, once initiated, within a particular time period. At step 1320, the server system initiates the authentication of the user in response to a) determining that a chat representative is available to process the request for service, and b) detecting engagement with the user, with the engagement relating to the request for service. The engagement may "relate" to the request for service in various ways. For example, the server system may send (or cause to be sent) a push notification relating to the request for service; detecting engagement may correspond receiving a response to the push notification. As another example, detecting engagement may simply mean detecting that the chat session is associated with an active (foreground) application executing on the client device. In one embodiment, the server system sends an authentication initiation message to an authentication service to perform the actual authentication of the user by presenting an authentication challenge corresponding to an authentication type determined by the server system.

Figure 14:
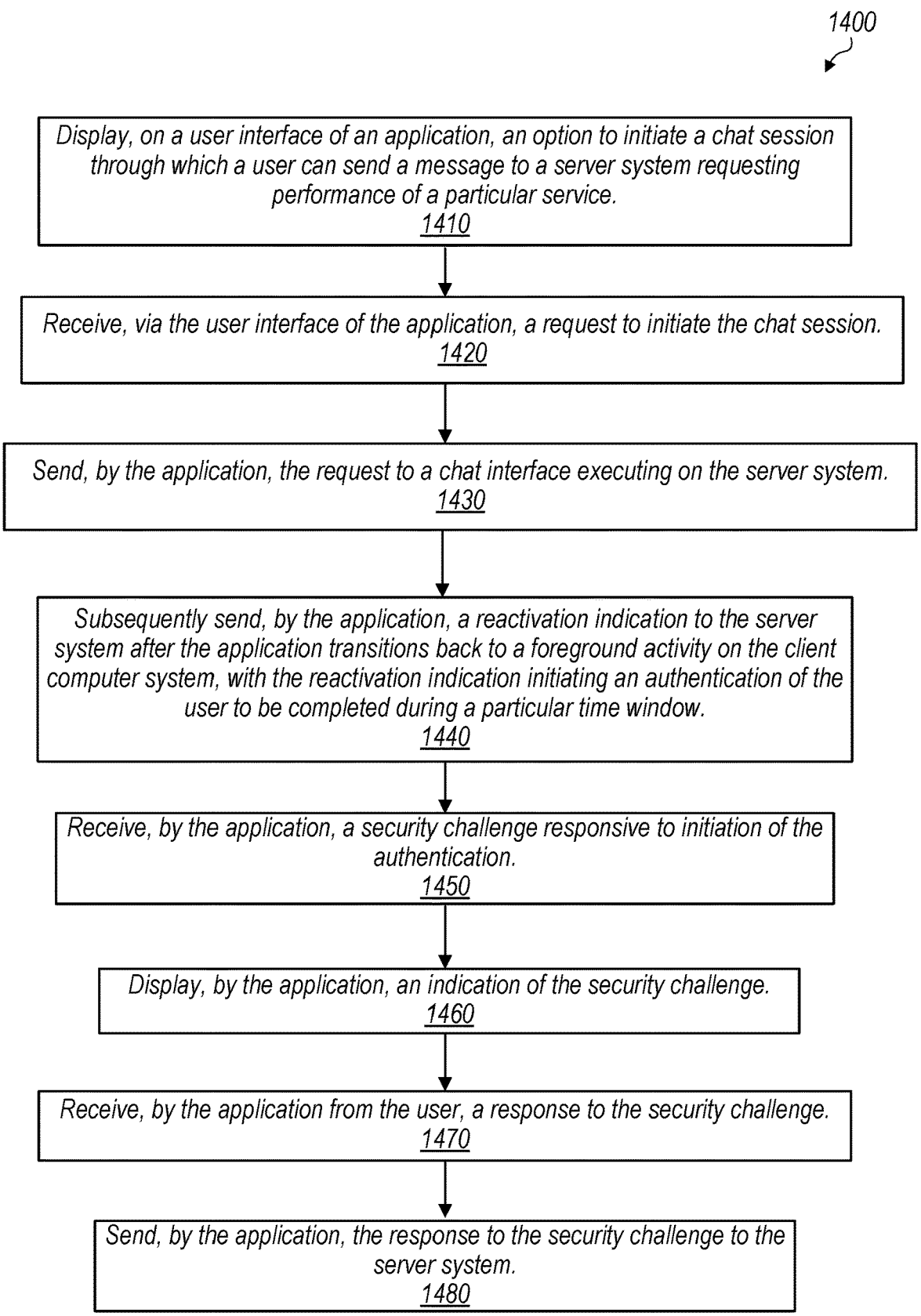
FIG. 14 illustrates a flowchart of one embodiment of a method implemented by a client device to facilitate delayed authentication of a user of the client device.

Turning now to FIG. 14, a flowchart of an example method 1400 implemented by a client device to facilitate authentication of a user of the client device is shown. In the illustrated embodiment, at step 1410, the client device displays, on a user interface of an application, an option to initiate a chat session through which a user can send a message to a server system requesting performance of a particular service. At step 1420, the client device receives via the user interface of the application, a request to initiate the chat session.

At step 1430, the client device sends, by the application executing on the device, the request to a chat interface executing on the server system. In some embodiments, the user of the client device may include textual metadata in the request for service message to indicate a detailed reason for the request for service, with an available chat representative interpreting the text metadata to ascertain the user's intended reason for the request for service, just in case it be different from the type of request indicated in the request for service.

At step 1440, the client device subsequently sends, by the application executing on the device, a reactivation indication to the server system after the application transitions back to a foreground activity on the client computer system, with the reactivation indication initiating an authentication of the user to be completed during a particular time window. For example, in one embodiment, the reactivation indication may be the user engagement indication 124 whereas in some other embodiments, a heartbeat signal 635 may serve as a reactivation indication.

At step 1450, the client device receives, by the application executing on the device, a security challenge responsive to initiation of the authentication. At step 1460, the client device displays, by the application executing on the device, an indication of the security challenge. As explained previously with reference to FIGS. 6A-B, 7 and 8, the server system may make a final determination of the authentication type for the user by overriding an initial determination of the authentication type at an earlier stage of processing.

At step 1470, the client device receives, by the application from the user, a response to the security challenge. At step 1480, the client device sends, by the application, the response to the security challenge to the server system. The successful response to the authentication challenge, received within a particular time of the authentication being initiated, ensures a successful authentication of the user.

Exemplary Computer System

Figure 15:
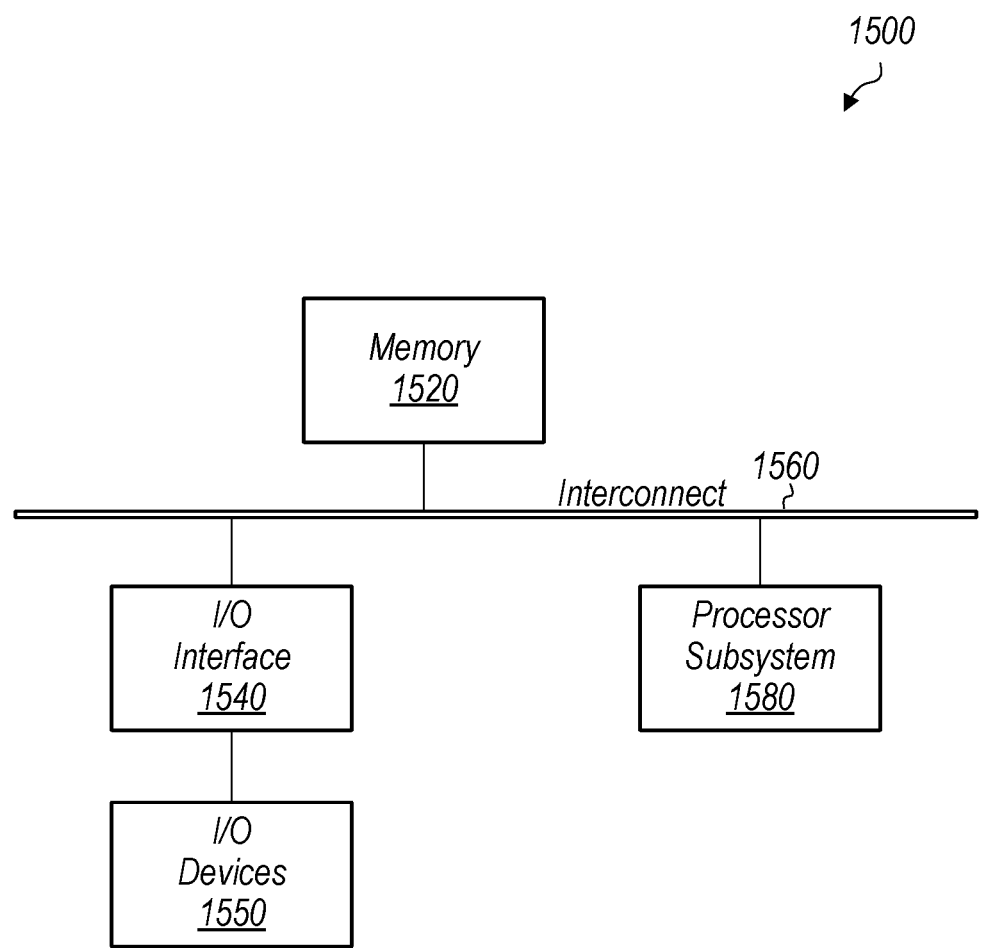
FIG. 15 is a block diagram of one embodiment of a computer system for implementing various systems described in the present disclosure.

Turning now to FIG. 15, a block diagram of an exemplary computer system 1500 is depicted. Computer system 1500 may be representative of any of the various computer systems described in this disclosure, including client device 110, server system 120, and authentication service 140. Computer system 1500 includes a processor subsystem 1580 that is coupled to a system memory 1520 and I/O interfaces(s) 1540 via an interconnect 1560 (e.g., a system bus). I/O interface(s) 1540 is coupled to one or more I/O devices 1550. Computer system 1500 may include additional functionality other than what is indicated in FIG. 15. Thus, client device 110 may include the components shown in FIG. 15, but may take various forms including a personal computer system, desktop computer, laptop or notebook computer, tablet computer, handheld computer, mobile device, etc. Although a single computer system 1500 is shown in FIG. 15 for convenience, system 1500 may also be implemented as two or more computer systems operating together.

Processor subsystem 1580 may include one or more processors or processing units. In various embodiments of computer system 1500, multiple instances of processor subsystem 1580 may be coupled to interconnect 1560. In various embodiments, processor subsystem 1580 (or each processor unit within processor subsystem 1580) may contain a cache or other form of on-board memory.

System memory 1520 is usable store program instructions executable by processor subsystem 1580 to cause system 1500 perform various operations described herein. System memory 1520 may be implemented using different physical memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 1500 is not limited to primary storage such as system memory 1520. Rather, computer system 1500 may also include other forms of storage such as cache memory in processor subsystem 1580 and secondary storage on I/O devices 1550 (e.g., a hard drive, storage array, etc.). In some embodiments, these other forms of storage may also store program instructions executable by processor subsystem 1580. In some embodiments, program instructions that when executed implement a server system 120, or an authentication service 140 may be included/stored within system memory 1520.

I/O interfaces 1540 may be any of various types of interfaces configured to couple to and communicate with other devices, according to various embodiments. In one embodiment, I/O interface 1540 is a bridge chip (e.g., Southbridge) from a front-side to one or more back-side buses. I/O interfaces 1540 may be coupled to one or more I/O devices 1550 via one or more corresponding buses or other interfaces. Examples of I/O devices 1550 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 1500 is coupled to a network via a network interface device (e.g., configured to communicate over WiFi, Bluetooth, Ethernet, etc.).

Although the present disclosure is described with reference to performing an authentication in the context of a chat session, the techniques described here can be more generally applicable. Consider any request for service that involves some interaction with the user after some delay period, which may correspond to waiting for some resource to become available. The techniques described above can be used to delay the interaction until some resource is available by determining a readiness condition that includes some indication of the resource's availability and some indication of the user's engagement. Accordingly, the techniques disclosed herein are not limited to delaying authentication of a user in the context of a chat session.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure (i.e., something physical). More specifically, this formulation is used to indicate that this structure is arranged to perform the one or more tasks during operation.: structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

In this disclosure, various "modules" operable to perform designated functions are shown in the figures and described in detail above (e.g., chat and authentication module 130, user engagement module 240, execution module 260, etc.).

What is claimed is:

1. A method, comprising:
   receiving, by a server system, an indication of a request for service that has been initiated by a user in a chat session within an application executed by a client device, wherein the request for service involves an authentication of the user that is dependent on the authentication being successfully completed within a particular time period after the authentication is initiated;
   delaying, by the server system, initiation of the authentication for the request for service until a readiness condition is satisfied, wherein the readiness condition indicates:
      that the server system is available to process the request for service; and
      that the user is engaged with the chat session relating to the request for service; and
   in response to detecting that the user is not currently engaged in the chat session and that the server system is available to process the request, sending, by the server system, a re-engagement notification to the client device, wherein the detecting is performed subsequent to receiving the request and prior to receiving user identification information from the user via the chat session; and
   in response to identifying, based on detecting that the user is re-engaged with the chat session, that the readiness condition is satisfied, the server system initiating the authentication of the user.

2. The method of claim 1, wherein the authentication is one step in a multi-factor authentication process, and wherein the authentication is based on an authentication code sent to the client device via short message service (SMS).

3. The method of claim 1, further comprising:
   storing, by the server system, information relating to the request for service in a particular entry in a queue that includes other entries with information relating to other requests for service received from other users via chat sessions on other user devices, wherein entries in the queue are handled by a chat representative;
   providing, by the server system to the chat representative, a message relating to the request for service when the particular entry reaches a top of the queue; and
   receiving, by the server system from the chat representative, an authorization of the request for service, wherein the authorization constitutes the server system being available to process the request for service.

4. The method of claim 1, further comprising:
   upon the request for service being provided to a chat representative, a chat authorization being provided by the chat representative, and determining a wait time between the request for service being received and the request for service being provided to the chat representative, pushing, by the server system, a notification to the client device; and
   receiving, by the server system, a reply to the notification; wherein providing the request for service to the chat representative constitutes the server system being available to process the request for service, and wherein receiving the reply constitutes detecting engagement with the user.

5. The method of claim 4, wherein the notification is pushed to the application, and wherein the reply is sent to the server system in response to an input from the user via the application.

6. The method of claim 4, wherein the notification is pushed to the application, and wherein the reply is automatically sent to the server system in response to the application running as a foreground activity on the client device.

7. The method of claim 1, further comprising:
   after the request for service being provided to a chat representative and the request for service being authorized by the chat representative, receiving a heartbeat signal from the application indicating that the application is running as a foreground activity on the client device, wherein receiving the heartbeat signal constitutes detecting engagement with the user.

8. The method of claim 1, further comprising:
   providing, by the server system via a chat interface, requests for service to various chat representatives;
   receiving, by the server system via the chat interface, a plurality of authorizations for the requests for service from the chat representatives, thus satisfying respective readiness conditions for the requests for service; and
   upon respective readiness conditions being authorized for the requests for service:
      initiating, by the server system, authentications for the authorized requests by sending the requests for service to an authentication service.

9. A system, comprising:
   at least one processor; and
   a memory having instructions stored thereon that are executable by the at least one processor to cause the system to:
      receive an indication of a request for service that has been initiated by a user in a chat session within an application executed by a client device, wherein the request for service involves an authentication of the user that is dependent on the authentication being successfully completed within a particular time period after the authentication is initiated;
      delay initiation of the authentication for the request for service until a readiness condition is satisfied, wherein the readiness condition indicates:
         that the system is available to process the request for service; and
         that the user is engaged with the chat session relating to the request for service; and
      in response to detecting user disengagement with the chat session and that the system is available to process the request, send a re-engagement notification to the client device, wherein the detecting is performed subsequent to receiving the request and prior to receiving user identification information from the user via the chat session; and
      in response to identifying, based on detecting that the user is re-engaged with the chat session, that the readiness condition is satisfied, initiate the authentication of the user.

10. The system of claim 9, wherein the authentication is one step in a multi-factor authentication process, and wherein the authentication is based on an authentication code sent to the client device via short message service (SMS).

11. The system of claim 9, wherein the instructions are further executable by the at least one processor to cause the system to:
   store information relating to the request for service in a particular entry in a queue that includes other entries with information relating to other requests for service received from other users via chat sessions on other user devices, wherein entries in the queue are handled by a chat representative;
   provide, to the chat representative, a message relating to the request for service when the particular entry reaches a top of the queue; and
   receive, from the chat representative, an authorization of the request for service, wherein the authorization constitutes the system being available to process the request for service.

12. The system of claim 9, wherein the instructions are further executable by the at least one processor to cause the system to:
   upon the request for service being provided to a chat representative and the request for service being authorized by the chat representative, push a notification to the client device; and
   receive a reply to the notification;
   wherein providing the request for service to the chat representative constitutes the system being available to process the request for service, and wherein receiving the reply constitutes detecting engagement with the user.

13. The system of claim 12, wherein the notification is pushed to the application, and wherein the reply is sent to the system in response to an input from the user via the application.

14. The system of claim 12, wherein the notification is pushed to the application, and wherein the reply is automatically sent to the system in response to the application running as a foreground activity on the client device.

15. A non-transitory computer-readable medium having program instructions stored thereon that are executable by a server system to perform operations comprising:
   receiving an indication of a request for service that has been initiated by a user in a chat session within an application executed by a client device, wherein the request for service involves an authentication of the user that is dependent on the authentication being successfully completed within a particular time period after the authentication is initiated;
   delaying initiation of the authentication for the request for service until a readiness condition is satisfied, wherein the readiness condition indicates:
      that the server system is available to process the request for service; and
      that the user is engaged with the chat session relating to the request for service; and
      in response to detecting that the user is not engaged in the chat session and that the server system is available to process the request, sending, by the server system, a re-engagement notification to the client device, wherein the detecting is performed subsequent to receiving the request and prior to receiving user identification information from the user via the chat session; and
   in response to identifying, based on detecting that the user is re-engaged with the chat session, that the readiness condition is satisfied, initiating the authentication of the user.

16. The non-transitory computer-readable medium of claim 15, wherein the authentication is one step in a multi-factor authentication process, and wherein the authentication is based on an authentication code sent to the client device via short message service (SMS).

17. The non-transitory computer-readable medium of claim 15, wherein the operations further comprise:
   storing information relating to the request for service in a particular entry in a queue that includes other entries with information relating to other requests for service received from other users via chat sessions on other user devices, wherein entries in the queue are handled by a chat representative;
   providing to the chat representative, a message relating to the request for service when the particular entry reaches a top of the queue; and
   receiving, from the chat representative, an authorization of the request for service, wherein the authorization constitutes the server system being available to process the request for service.

18. The non-transitory computer-readable medium of claim 15, wherein the operations further comprise:
   upon the request for service being provided to a chat representative and the request for service being authorized by the chat representative, pushing a notification to the client device; and
   receiving a reply to the notification;
   wherein providing the request for service to the chat representative constitutes the server system being available to process the request for service, and wherein receiving the reply constitutes detecting engagement with the user.

19. The non-transitory computer-readable medium of claim 18, wherein the notification is pushed to the application, and wherein the reply is sent to the server system in response to an input from the user via the application.

20. The non-transitory computer-readable medium of claim 15, wherein the operations further comprise:
   after the request for service being provided to a chat representative and the request for service being authorized by the chat representative, receiving a heartbeat signal from the application indicating that the application is running as a foreground activity on the client device, wherein receiving the heartbeat signal constitutes detecting engagement with the user.

* * * * *